United States Patent [19]
Shaffer et al.

[11] Patent Number: 5,888,163
[45] Date of Patent: Mar. 30, 1999

[54] HYDRAULIC COUPLING FOR VEHICLE DRIVETRAIN

[75] Inventors: Theodore E. Shaffer; Murat N. Okcuoglu, both of Santa Barbara, Calif.

[73] Assignee: ASHA Corporation, Santa Barbara, Calif.

[21] Appl. No.: 25,486

[22] Filed: Feb. 18, 1998

Related U.S. Application Data

[63] Continuation of Ser. No. 733,362, Oct. 17, 1996, Pat. No. 5,735,764, and a continuation of Ser. No. 482,761, Jun. 7, 1995, Pat. No. 5,595,214, and a continuation-in-part of Ser. No. 205,900, Mar. 3, 1994, Pat. No. 5,536,215, and a continuation-in-part of Ser. No. 16,168, Feb. 10, 1993, Pat. No. 5,310,388.

[51] Int. Cl.$^6$ ................................................... F16H 48/22
[52] U.S. Cl. .......................................... 475/88; 192/103 F
[58] Field of Search .......................... 192/103 F, 85 AA, 192/35; 475/88; 137/513.5, 855

[56] References Cited

U.S. PATENT DOCUMENTS

| | | |
|---|---|---|
| 1,660,588 | 1/1928 | Wishart et al. . |
| 2,004,929 | 6/1935 | Centervall . |
| 2,026,777 | 1/1936 | Dumble . |
| 2,775,141 | 12/1956 | Ronning . |
| 2,899,981 | 8/1959 | Binks . |
| 2,913,928 | 11/1959 | Double . |
| 2,922,319 | 1/1960 | Burner . |
| 3,229,550 | 1/1966 | Nickell . |
| 3,230,795 | 1/1966 | Mueller . |
| 3,251,244 | 5/1966 | Nickell . |
| 3,350,961 | 11/1967 | Dodge . |
| 3,361,008 | 1/1968 | Fallon . |
| 3,393,582 | 7/1968 | Mueller . |
| 3,407,599 | 10/1968 | Ulbricht . |
| 3,490,312 | 1/1970 | Seitz et al. . |
| 3,686,976 | 8/1972 | Philippi . |
| 3,724,289 | 4/1973 | Kennicutt . |
| 3,748,928 | 7/1973 | Shiber . |
| 3,752,280 | 8/1973 | Cheek . |
| 3,835,730 | 9/1974 | Pemberton . |
| 3,894,446 | 7/1975 | Snoy et al. . |

(List continued on next page.)

FOREIGN PATENT DOCUMENTS

| | | |
|---|---|---|
| 1217791 | 12/1959 | France . |
| 1079479 | 3/1984 | U.S.S.R. . |
| 2038429 | 11/1982 | United Kingdom . |

*Primary Examiner*—Rodney H. Bonck
*Attorney, Agent, or Firm*—Brooks & Kushman P.C.

[57] ABSTRACT

A control valve (80) of a hydraulic coupling (32) controls pumping from a casing inlet port (58) by a hydraulic pump (48) through a casing outlet port (78) to control coupling between two rotary members such as by operation of a clutch (68). The casing (34) is connected to one of the rotary members while a pumping component embodied by an impeller (50) is connected to the other rotary member and meshed with an internal ring gear (54) having one more tooth than the number of impeller teeth to provide sufficient pumping capacity so that the pump can act as a brake while still having relatively constant pumping pressure. The control valve (80) includes an elongated valve element (82) mounted within a recess (98) to provide accurate control of its closure when the pumped hydraulic fluid reaches a predetermined pressure corresponding to a predetermined extent of relative rotation between the two drivetrain members. This elongated valve element (82) is made from a bimetallic strip so as to be temperature compensated and the outlet port (78) is provided with a main passage (94) as well as a bleed passage (96,96') that is cleaned when the valve element is opened. One construction has a valve body defining both the main passages (94) and the bleed passage (96) of the port, while another construction has the valve body defining the main passage (94) and the valve element (82) defining the bleed passage (96'). Another construction has the recess (98) provided with an inclination extending from the port (78) and has a flat elongated valve element (82) that may be either straight or curved.

6 Claims, 13 Drawing Sheets

U.S. PATENT DOCUMENTS

| | | |
|---|---|---|
| 3,923,113 | 12/1975 | Pagdin . |
| 3,987,689 | 10/1976 | Engle . |
| 4,012,968 | 3/1977 | Kelbel . |
| 4,031,917 | 6/1977 | De John et al. . |
| 4,041,804 | 8/1977 | Clark . |
| 4,091,901 | 5/1978 | F'Geppert . |
| 4,177,831 | 12/1979 | Benjamin ............................ 137/513.5 |
| 4,253,491 | 3/1981 | Worthen et al. . |
| 4,258,588 | 3/1981 | Yum . |
| 4,263,824 | 4/1981 | Mueller . |
| 4,272,993 | 6/1981 | Kopich . |
| 4,388,196 | 6/1983 | Lucia . |
| 4,445,400 | 5/1984 | Sullivan et al. . |
| 4,493,387 | 1/1985 | Lake et al. . |
| 4,548,096 | 10/1985 | Giocastro et al. . |
| 4,601,359 | 7/1986 | Weismann et al. . |
| 4,606,428 | 8/1986 | Giere . |
| 4,630,505 | 12/1986 | Williamson . |
| 4,644,822 | 2/1987 | Batchelor . |
| 4,650,028 | 3/1987 | Batchelor . |
| 4,679,463 | 7/1987 | Ozaki et al. . |
| 4,714,129 | 12/1987 | Mueller . |
| 4,719,998 | 1/1988 | Hiramatsu et al. . |
| 4,727,966 | 3/1988 | Hiramatsu et al. . |
| 4,730,514 | 3/1988 | Shikata et al. . |
| 4,732,052 | 3/1988 | Dewald . |
| 4,821,604 | 4/1989 | Asano . |
| 4,867,012 | 9/1989 | McGarraugh . |
| 4,876,921 | 10/1989 | Yasui et al. . |
| 4,884,470 | 12/1989 | Onoue . |
| 4,905,808 | 3/1990 | Tomita et al. . |
| 4,909,371 | 3/1990 | Okamoto et al. . |
| 4,919,006 | 4/1990 | Willett et al. . |
| 4,924,989 | 5/1990 | Filderman ........................ 192/103 F |
| 4,957,473 | 9/1990 | Takemura et al. . |
| 4,960,011 | 10/1990 | Asano . |
| 4,966,268 | 10/1990 | Asano et al. . |
| 4,974,471 | 12/1990 | McGarraugh . |
| 5,005,131 | 4/1991 | Imaseki et al. . |
| 5,087,228 | 2/1992 | Johansson . |
| 5,189,930 | 3/1993 | Kameda . |
| 5,213,125 | 5/1993 | Leu . |
| 5,310,388 | 5/1994 | Okcuoglue et al. . |
| 5,320,586 | 6/1994 | Baxter, Jr. . |
| 5,536,215 | 7/1996 | Shaffer et al. . |
| 5,595,214 | 1/1997 | Shaffer et al. ......................... 137/517 |
| 5,735,764 | 4/1998 | Shaffer et al. ........................... 475/88 |

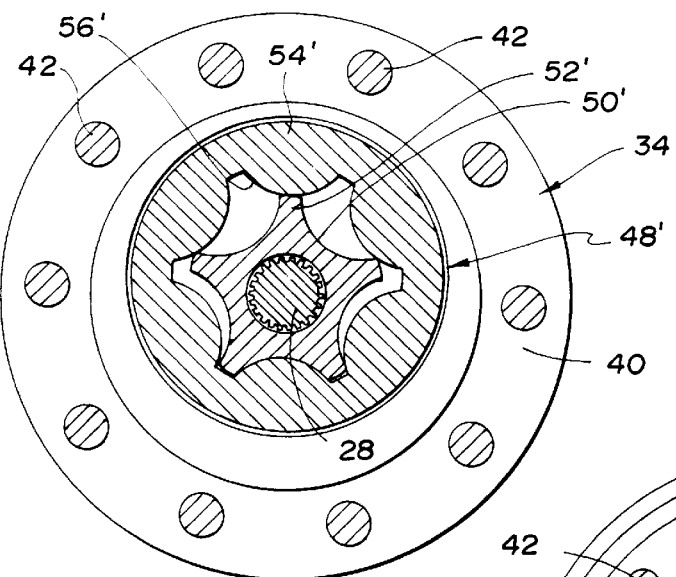
Fig. 3
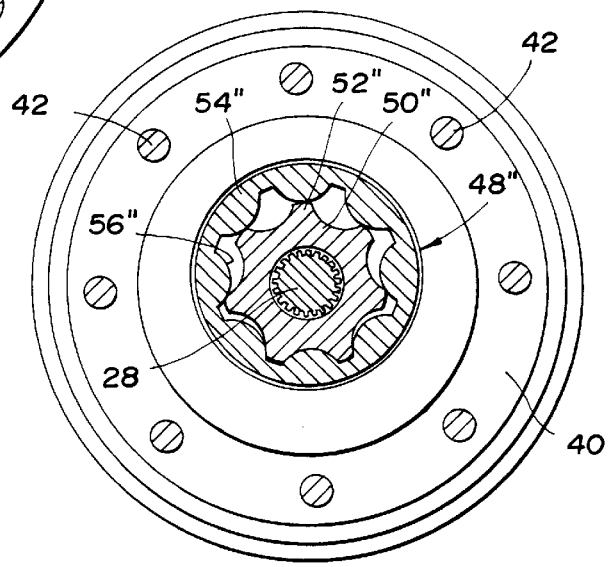
Fig. 4
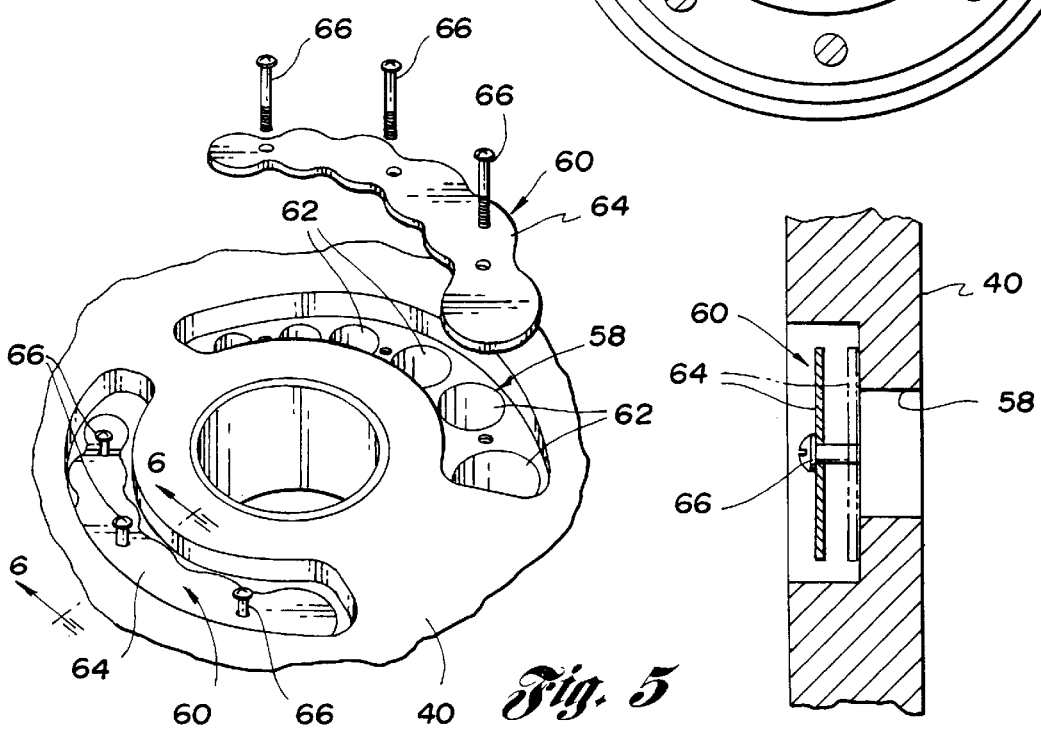
Fig. 5
Fig. 6

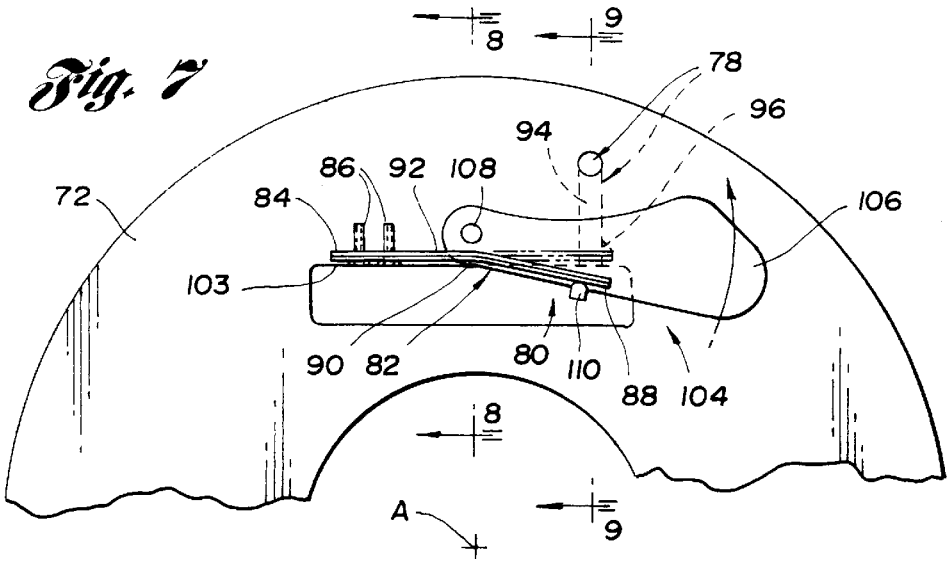
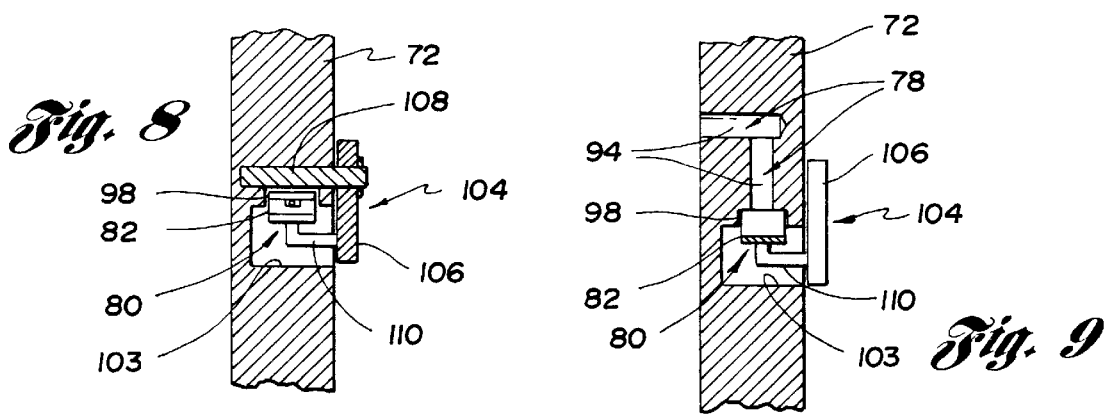
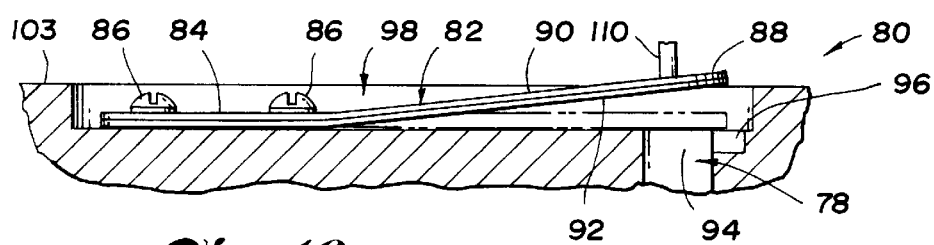
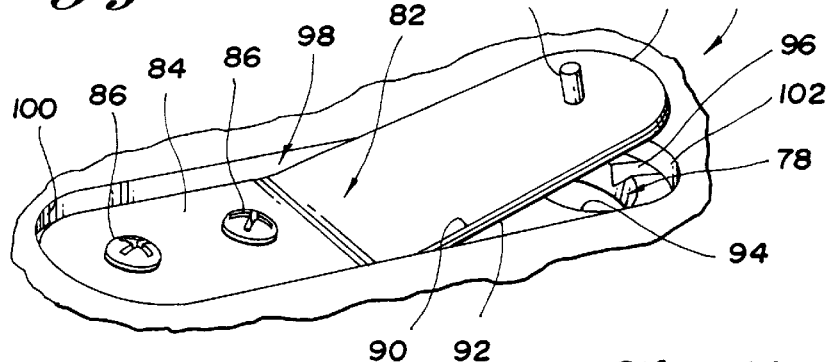

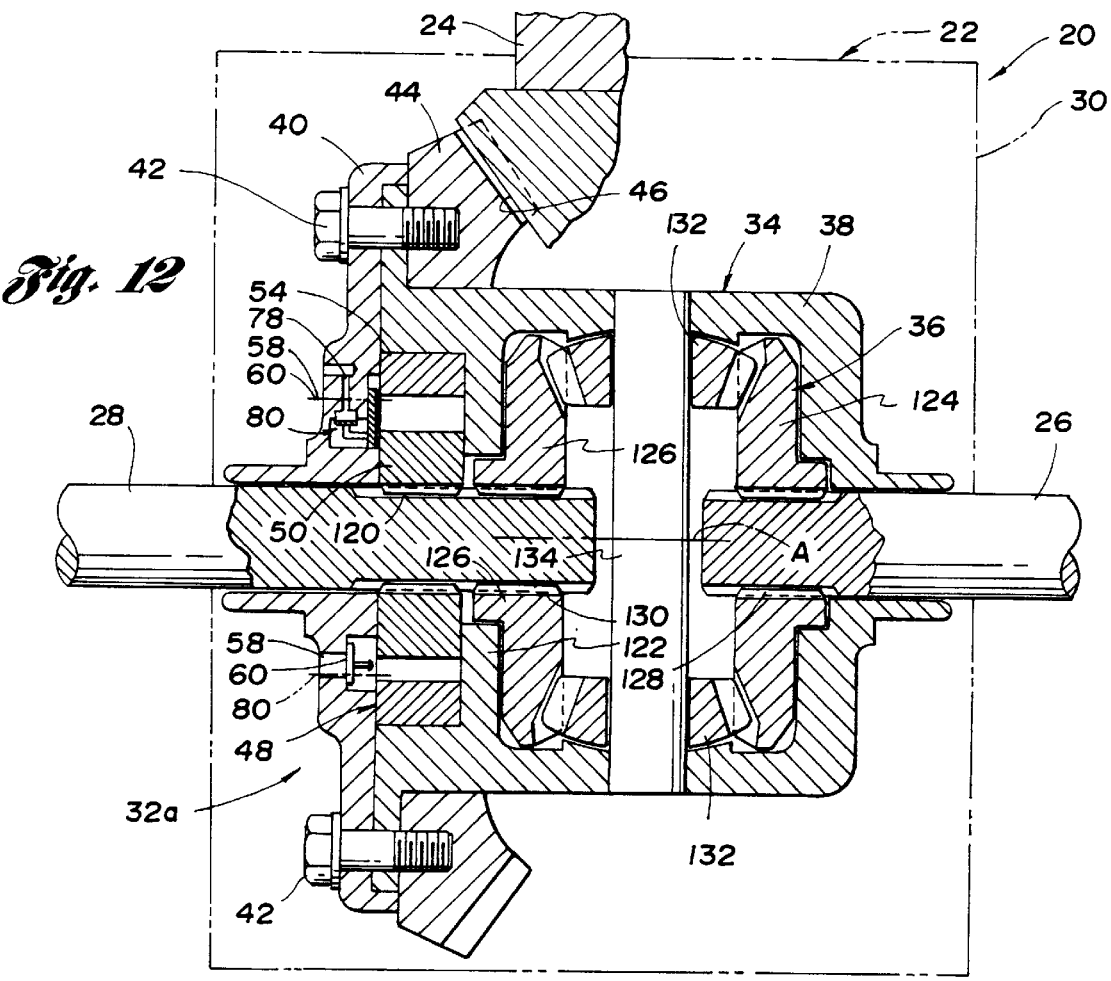

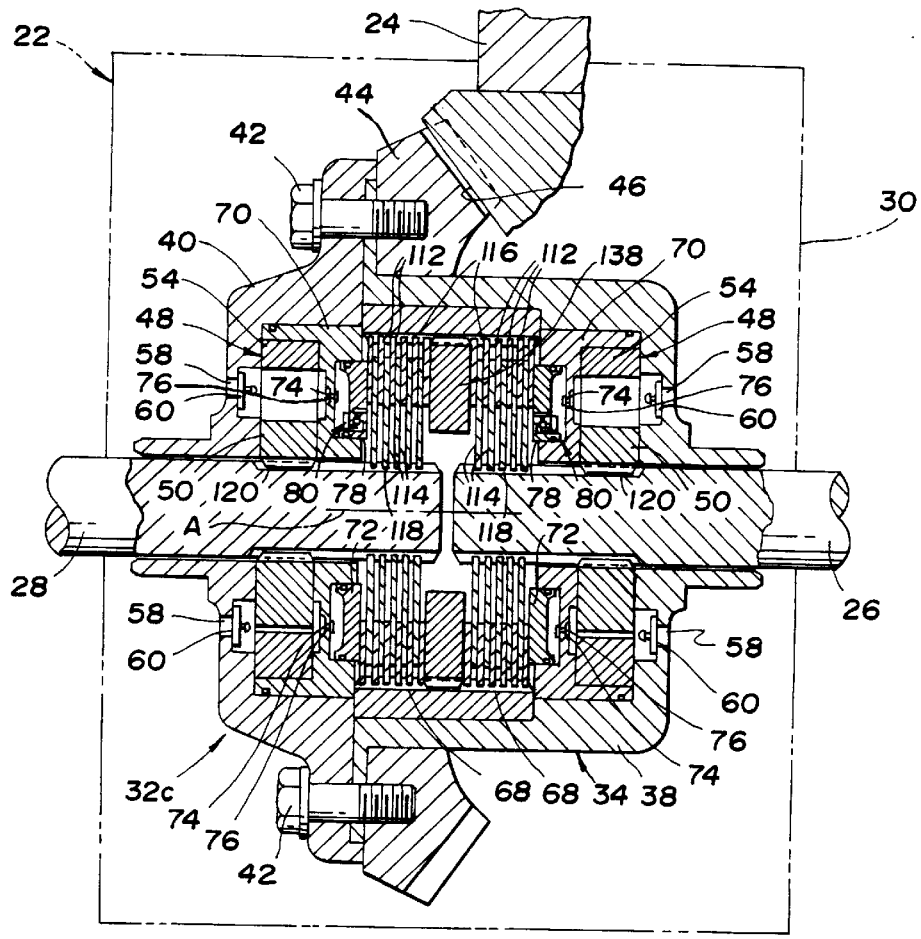
*Fig. 14*
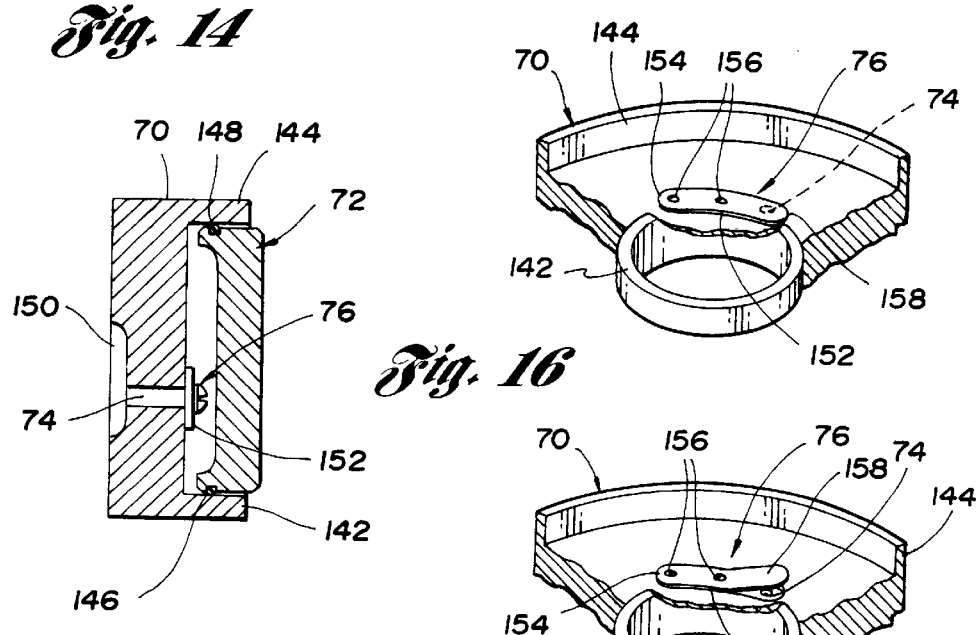
*Fig. 15*  *Fig. 16*  *Fig. 17*

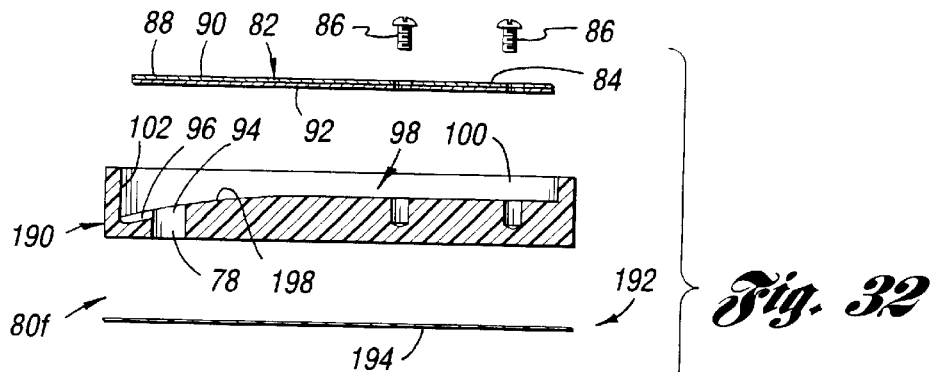
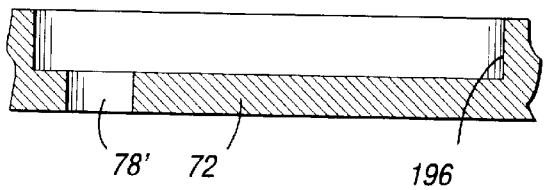
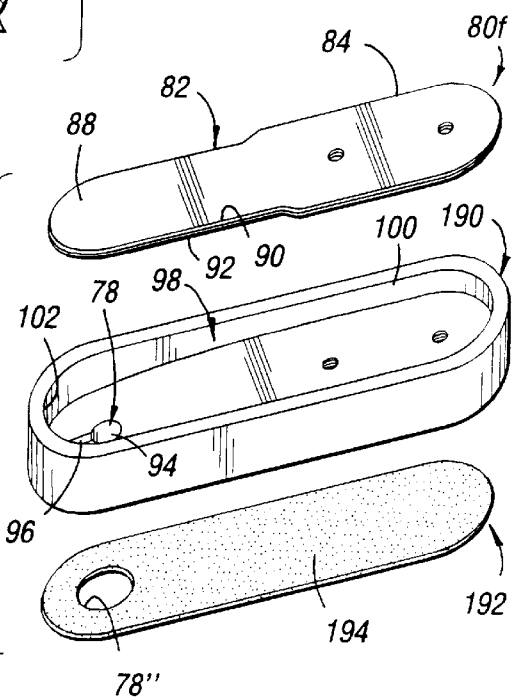
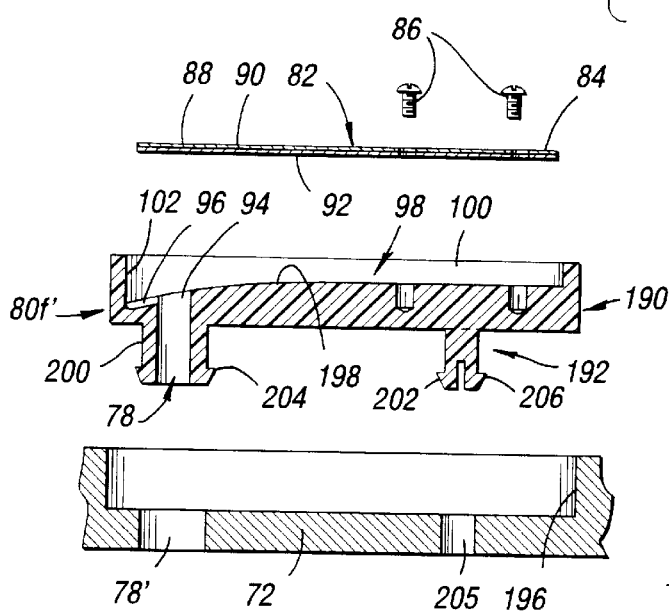

HYDRAULIC COUPLING FOR VEHICLE DRIVETRAIN

CROSS REFERENCE TO RELATED APPLICATIONS

This application is a continuation of prior application Ser. No. 08/733,362 now U.S. Pat. No. 5,735,764, filed on Oct. 17, 1996 in the names of Theodore E. Shaffer and Murat N. Okcuoglu as a continuation of application Ser. No. 08/482,761, filed on Jun. 7, 1995 now U.S. Pat. No. 5,595,214, in the names of Theodore E. and Murat N. Okcuoglu as a continuation-in-part of prior application Ser. No. 08/205,900, now U.S. Pat. No. 5,536,215, filed on Mar. 3, 1994 in the names of Murat N. Okcuoglu and Theodore E. Shaffer as a continuation-in-part of prior application Ser. No. 08/016,168 filed on Feb. 10, 1993 in the name of Murat N. Okcuoglu and Theodore E. Shaffer, now U.S. Pat. No. 5,310,388.

TECHNICAL FIELD

This invention relates to a hydraulic coupling for use with a vehicle drivetrain within a housing thereof containing hydraulic fluid to rotatively couple a pair of rotary members about a rotational axis.

BACKGROUND ART

Hydraulic couplings have previously utilized hydraulic pumps to couple rotary members of a vehicle drivetrain. For example, U.S. Pat. No. 4,012,968 Kelbel discloses a differential mechanism wherein a hydraulic pump of the gerotor type is located radially outward from the axis of rotation of the two members and provides pumped hydraulic fluid to a clutch that controls operation of a bevel type planetary gear set to limit the differential action so as to thus have a limited slip function. U.S. Pat. No. 4,730,514 Shikata et al discloses another differential mechanism wherein a hydraulic pump controls operation of a bevel gear type planetary gear set that extends between two rotary members such that a limited slip function of the differential gear operation is also provided. Furthermore, U.S. Pat. Nos. 3,748,928 Shiber; 4,719,998 Hiramatsu et al; 4,719,998 Hiramatsu et al; 4,727,966 Hiramatsu et al; and 4,909,371 Okamoto et al disclose hydraulic pumps utilized within vehicle drivetrains to control actuation of a clutch that connects two rotary members of a vehicle drivetrain.

DISCLOSURE OF INVENTION

An object of the present invention is to provide an improved control valve for use in controlling rotative coupling of a pair of rotary members of a vehicle drivetrain.

In carrying out the above object, the control valve includes a valve element and a port through which pressurized hydraulic fluid selectively flows to control the coupling of the pair of rotary members. The port includes a main passage and a bleed passage that is communicated with the main passage. The valve element of the control valve is mounted for movement between an open position spaced from the main passage of the port and a closed position where the valve element closes the main passage of the port but permits pressurized hydraulic fluid to bleed through the bleed passage, and the bleed passage upon subsequent movement of the valve element to the open position is cleaned by fluid flow through both passages of the port.

In the preferred construction, the control valve has the valve element constructed as an elongated valve element having one portion that is mounted in a spaced relationship to the port and having a distal end that is movable between the open position spaced from the main passage of the port and the closed position that closes the main passage of the port but allows hydraulic fluid to bleed through the bleed passage. This elongated valve element is preferably constructed from a bimetallic strip so as to adjust for temperature changes during use.

The control valve has a valve body including an elongated mounting recess having one location at which the one portion of the elongated valve element is mounted and having an end at which the main passage of the port extends through the valve body. In one construction, the valve body defines the main passage of the port and also defines the bleed passage of the port. In another construction, the valve body defines the main passage of the port and the distal end of the valve element defines the bleed passage of the port.

The elongated valve element is disclosed in different constructions as having both a straight shape and a curved shape.

In one construction of the control valve, the valve body has an elongated mounting recess having one portion at which the one portion of the elongated valve element is mounted and has an end at which the main passage of the port extends through the valve body, and the valve element has a generally flat shape between the one portion and its distal end. The recess in this construction has a greater depth at the end thereof than at said portion thereof and is inclined therebetween. The recess has a curved surface providing its inclination between its one end and said one portion thereof where the valve element is mounted on the valve body. A connector is also disclosed for securing the valve body for use. This connector may be provided by an adhesive or one or more mechanical fasteners. The valve body is advantageously constructed as a plastic injection molding.

One construction of the control valve that is particularly adaptable for use in a supercharged circuit with a pair of the ports and has its valve body provided with an elongated mounting recess of a curved shape including opposite ends and a curved intermediate portion extending between its ends. The valve element in this construction is generally flat and has a pair of opposite ends as well as a curved intermediate portion extending between its ends and mounted within the recess at the curved intermediate portion of the recess. Each of the pair of ports has the same construction and the main passage of each port extends through the valve body at an associated end of the recess, and the recess has a greater depth at each end thereof than at the intermediate portion thereof and is inclined from each end thereof to its intermediate portion. This recess preferably has curved surfaces providing the inclination between each end thereof and its intermediate portion. Furthermore, like the straight construction of the control valve, the curved control valve is also disclosed as including a connector for securing the valve body for use. Likewise, the connector can be either an adhesive or one or more mechanical fasteners and the construction of the control valve is advantageously made as a plastic injection molding with the recess having curved surfaces providing the inclination between each end thereof and its intermediate portion.

The objects, features and advantages of the present invention are readily apparent from the following detailed description of the best modes for carrying out the invention when taken in connection with the accompanying drawings.

BRIEF DESCRIPTION OF DRAWINGS

FIG. 3 is a view similar to FIG. 2 to illustrate that the pump can also have its impeller provided with five teeth and its internal ring gear provided with six teeth when a greater pumping capacity is desired;

FIG. 4 is a view similar to FIGS. 2 and 3 but illustrating the impeller as having seven teeth and the internal ring gear as having eight teeth when a more constant fluid pressure is desired;

FIG. 5 is an exploded perspective view illustrating the construction of inlet valves for inlet ports through which hydraulic fluid is pumped into a casing of the coupling;

FIG. 6 is a sectional view taken along the direction of line 6—6 in FIG. 5 to illustrate the opening and closing valve operation;

FIG. 7 is a longitudinal view taken along the direction of line 7—7 in FIG. 1 to illustrate the control valve which is constructed according to the invention and is associated with an outlet port through which the hydraulic fluid is pumped from the casing and whose operation controls the coupling of the rotary members to each other;

FIG. 8 is a sectional view taken along the direction of line 8—8 in FIG. 7 and further discloses a valve closure which closes the valve when the casing rotates above a predetermined speed;

FIG. 9 is a sectional view taken along the direction of line 9—9 in FIG. 7 to further illustrate the control valve and valve closure construction;

FIG. 10 is a partial sectional view that further illustrates the construction of the control valve at the outlet with a valve element thereof shown in a solid line indicated open position and a phantom line indicated closed position with respect to the outlet port;

FIG. 11 is a perspective view that further illustrates the construction of the outlet port and the valve;

FIG. 12 is a sectional view similar to FIG. 1 of a related embodiment of the hydraulic coupling having the control valve of this invention and wherein the hydraulic pump functions as a brake upon the valve closing such that braking action provides the sole coupling operation that limits differential action of the associated planetary gear set;

FIG. 13 is a view similar to FIG. 1 of another embodiment of the hydraulic coupling having the control valve of this invention and which has a construction having particular utility for use in a vehicle transfer case to connect front and rear axles;

FIG. 14 is a view similar to FIG. 1 of another embodiment of the hydraulic coupling having the control valve of this invention and which includes a pair of hydraulic pumps and associated clutches that rotatively couple a pair of rotary members of the associated drivetrain upon the valve closing;

FIG. 15 is an enlarged sectional view illustrating the transfer port and associated check valve through which the hydraulic fluid is pumped to the clutch actuating piston;

FIG. 16 is a partial perspective view that further illustrates the transfer port check valve in its closed position;

FIG. 17 is a partial perspective view similar to FIG. 16 but with the transfer port check valve shown in its open position;

FIG. 32 is an exploded sectional view taken in the same direction as FIG. 29 through another embodiment of the control valve wherein the valve element is flat and has an elongated straight shape and wherein the valve body has a recess whose port end is deeper than the location at which the valve element is mounted;

FIG. 33 is an exploded perspective view that further illustrates the embodiment of FIG. 32 which is mounted for use as illustrated in both of these views by an adhesive that is provided on a film;

FIG. 34 is a sectional view of a further modification of the control valve taken in the same direction as FIG. 32 and having the same construction except for mounting thereof that is provided by mechanical fasteners illustrated as being injection molded with the valve body;

BEST MODES FOR CARRYING OUT THE INVENTION

Figure 1:
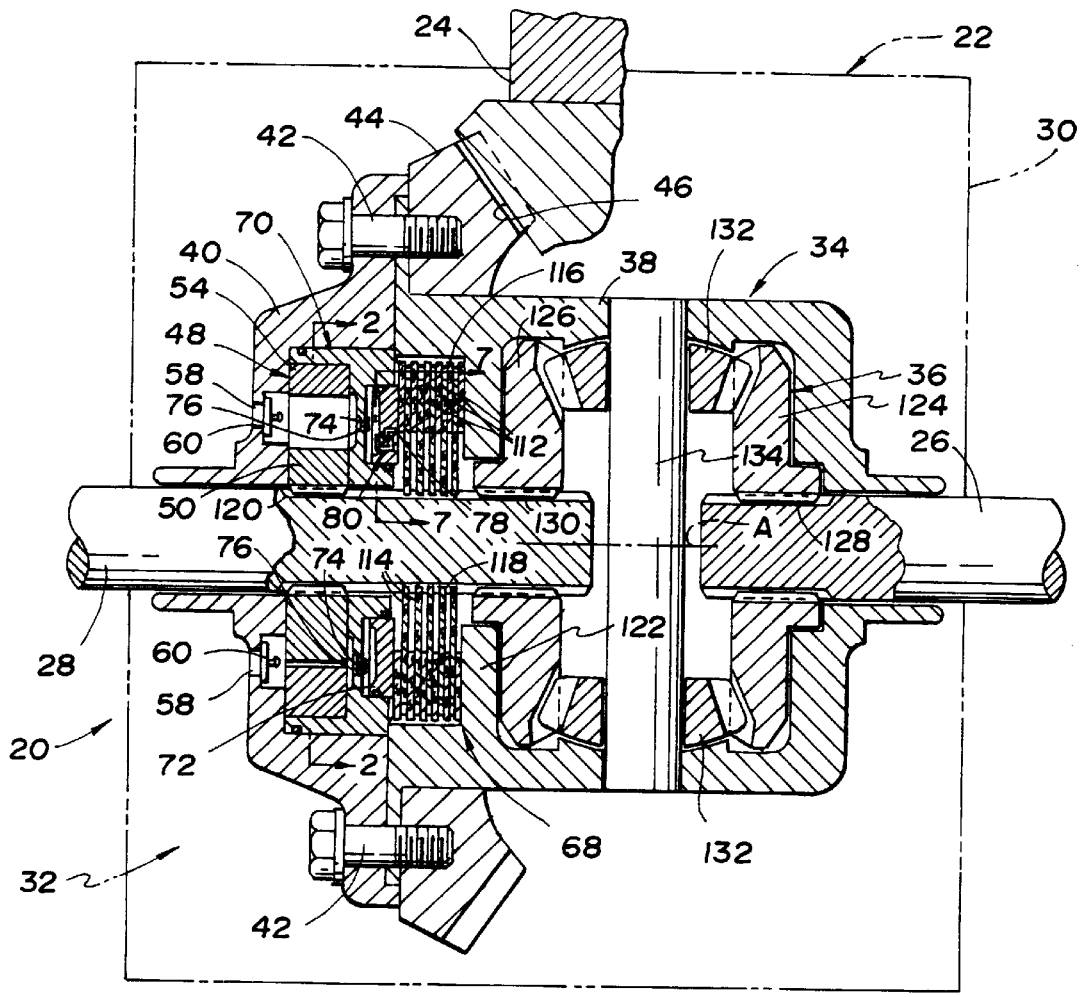
FIG. 1 is a sectional view taken through one embodiment of a hydraulic coupling including a control valve constructed in accordance with the present invention and operable to couple a pair of rotary members by a hydraulic pump having an associated clutch for limiting differential operation of a planetary gear set embodied by a bevel type differential.

With reference to FIG. 1 of the drawings, a partially illustrated vehicle drivetrain that is generally indicated by 20 includes a differential 22 that is rotatively driven from the vehicle engine by a rotary drive member 24 and operates to drive a pair of axial half shafts 26 and 28 that respectively embody a pair of rotary members which rotate about a rotational axis A. The differential includes a housing 30 for containing hydraulic fluid and having suitable unshown seals through which the rotary members 24, 26 and 28 project. Within the housing 30, the differential includes a hydraulic coupling 32 that operates to rotatively couple the axial half shafts 26 and 28 driven by the rotary drive member 24 as is hereinafter more fully described.

With continuing reference to FIG. 1, the hydraulic coupling 32 includes a casing 34 of a hollow construction that is rotatable within the housing about the rotational axis A and connected to one of the rotary members, which in the illustrated embodiment is the right axle half shaft 26, with the connection being provided by a planetary gear set 36 that is of the bevel gear planetary type as is hereinafter more fully described. Casing 34 as illustrated includes a cup-shaped member 38 and a cap member 40 which each have peripheral flanges secured to each other by circumferentially spaced bolts 42 that also secure a ring gear 44 of the bevel type which is rotatively driven by a bevel driving portion 46 of the drive member 24.

Figure 2:
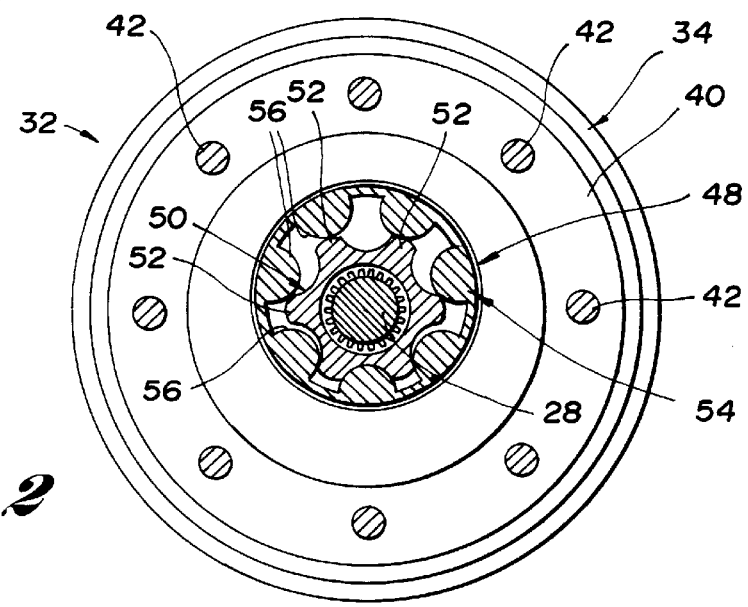
FIG. 2 is a sectional view taken through the pump along the direction of line 2—2 in FIG. 1 and discloses the pump as having an impeller with six teeth meshed with an internal ring gear having seven teeth to provide a pumping action that allows the pump to function as a brake while still having relatively constant pumping pressure that facilitates actuation of the associated clutch without fluid pressure pulsation.

With combined reference to FIGS. 1 and 2, the hydraulic coupling 32 also includes a hydraulic pump 48 located within the casing 34 along the rotational axis A and including a pumping component embodied by an impeller 50 having external teeth 52. The hydraulic pump also includes an internal ring gear 54 mounted by the casing 34 for rotation eccentrically with respect to the toothed impeller 50 and including internal teeth 56 of a number that is one more than the impeller teeth and which are in a meshing relationship with the impeller teeth to provide a pumping action upon relative rotation between the casing and the toothed impeller. As is hereinafter more fully described, the impeller 50 most preferably has six teeth 52 and the internal ring gear 54 has seven teeth 56 which is a relationship that provides sufficient pumping capacity so that the hydraulic pump can act effectively as a brake while still having relatively constant pumping pressure without fluid pulsation that would adversely affect the hydraulic coupling provided between the rotary members. As shown in FIG. 3, it is also possible for the hydraulic pump 48' to have its impeller 50' provided with five external teeth 52' and for the ring gear 54' to have six teeth 56' meshed with the impeller teeth which is a construction that will provide a somewhat greater pumping capacity but less consistency in the fluid pressure but not so inconsistent as to interfere with effective hydraulic coupling between the rotary members. Likewise as illustrated in FIG. 4, it is also possible for the hydraulic pump 48" to have its impeller 50" provided with seven internal teeth 52" and its internal ring gear 54" to have eight teeth 56" when more consistent fluid pressure is desirable even though there is an accompanying decrease in the amount of pumped fluid. Thus, the impeller has between five and seven external teeth with six being most preferable while the internal ring gear has one more tooth than the number of impeller teeth utilized.

With combined reference to FIGS. 1, 5 and 6, the casing 34 has an inlet 58 through which hydraulic fluid is pumped into the casing by the hydraulic pump 48. As illustrated in FIG. 1, there are actually two of the inlets 58 such that the pumping takes place in both directions of relative rotation between the rotary member embodied by the axle half shaft 28 and the casing 34. In this connection, each of the inlets 58 includes an associated check valve 60 for opening and closing inlet bores 62 of varying size along the direction of rotation. Each check valve 60 as shown in FIGS. 5 and 6 has a thin valve element 64 that is mounted by guides such as the threaded bolts 66 show for movement between the solid line indicated open position of FIG. 6 and the phantom line indicated closed position. Upon one direction of relative rotation between the impeller 50 and the internal gear 54 shown in FIG. 2, one of the check valves 60 opens to permit the hydraulic fluid to be pumped from the housing 30 into the casing 34 while the other check valve 60 is then closed so that the hydraulic fluid is not pumped out of the casing through the other inlet port. During the opposite direction of relative rotation between the impeller 50 and the casing 34, the open and closed positions of the inlet ports 58 is reversed.

As illustrated in FIG. 1, a clutch 68 is received within the cup-shaped member 38 of casing 34 adjacent the junction thereof with the cap member 40 of the casing. Within the casing cap member 40, a pump housing insert 70 is mounted and receives the hydraulic pump 48 as well as interfacing with the clutch 68. This insert 70 has an annular piston chamber 71 that receives a clutch actuating piston 72 that engages the clutch 68 as is hereinafter more fully described to couple the casing 34 with the left axle half shaft 28 as is also hereinafter more fully described. Insert 70 also has a wall defining a pair of transfer ports 74 through which hydraulic fluid is pumped from the hydraulic pump 48 to the clutch actuating piston 72 within the piston chamber 71. This flow through the transfer ports 74 is through one of the transfer ports upon one direction of relative rotation between the impeller 52 and the ring gear 54 and is through the other transfer port during the other direction of relative rotation between the impeller and the ring gear. Each of the transfer ports 74 has an associated check valve 76 of a construction that is hereinafter more fully described in connection with FIGS. 15 through 17. These check valves 76 ensure that the hydraulic fluid pumped through either transfer port to the clutch actuating piston 72 is not pumped back into the hydraulic pump 48 through the other transfer port.

As best illustrated in FIGS. 7 and 9, an outlet port 78 is also provided and in the embodiment of FIG. 1 is located on the clutch actuating piston 72. A control valve 80 of the coupling is constructed in accordance with the present invention and closes the outlet port 78 as is hereinafter more fully described when the pumped fluid reaches a predetermined pressure which is proportional to the relative rotation between the pump impeller and ring gear and thus corresponds to the relative rotation between the right axle half shaft 26 connected through the differential 36 to the casing 34 and the left axle half shaft 28 that is connected to the impeller 50. As the pumped hydraulic fluid reaches the predetermined pressure, the valve 80 closes as is hereinafter more fully described to close the outlet port 78 and thus prevent the hydraulic fluid from being pumped from the hydraulic pump 48. This causes the hydraulic pump 48 to act as a brake by coupling the impeller 52 with the internal ring gear 54 and thereby also couples the rotary members embodied by the right and left axle half shafts 26 and 28 to each other.

As best illustrated in FIGS. 10 and 11, the valve 80 includes an elongated metallic strip valve element 82 having one portion or end 84 that is mounted in a spaced relationship to the outlet port 78 in any suitable manner such as by the headed bolts 86 illustrated. Valve element 82 also has a distal end 88 that is movable between a solid line indicated open position spaced from the outlet port 78 as shown in FIG. 10 and a phantom line indicated closed position that closes the outlet port. This valve element 82 is of the bimetallic type and thus includes two metals 90 and 92 that have different coefficients of thermal expansion so as to cause the valve element to move as its temperature is raised and lowered. More specifically, as the hydraulic fluid is heated such as during continued usage, the valve element end 88 moves toward the outlet port 78 with the net result being that the less viscous fluid will close the valve 80 at the same pressure of pumped fluid corresponding to the same amount of relative rotation between the axle half shafts. Furthermore, upon cooling of the hydraulic fluid such as after rest for a certain period of time, the valve element end 88 moves away from the outlet port 78 such that the valve closes at the same pressure of pumping of the more viscous hydraulic fluid. Thus, the bimetallic valve element 82 compensates for viscosity changes as the hydraulic fluid is heated and cooled to ensure that the coupling between the two rotary members embodied by the two axle half shafts takes place at the same rate of relative rotation. More specifically, the valve closing as discussed above causes the hydraulic pump 48 to then function as a brake that limits the relative rotation between the two rotary members embodied by the two axle half shafts and also causes the actuation of the clutch 68 to further couple the two axle half shafts to each other.

As best illustrated in FIGS. 10 and 11, the outlet port 78 preferably includes a main passage 94 that is closed by the valve element 82 as its end 88 moves from the open position to the closed position as previously described. Outlet port 78 also includes a bleed passage 96 that remains open even when the valve element 82 is closed with respect to the main passage 94 in order to provide a bleed flow of hydraulic fluid that cools the clutch 68 and also ensures that the temperature of the hydraulic fluid within the pump 48 does not excessively increase at a rapid rate. When the valve element 82 opens, the fluid flow through both passages of the outlet port 78 provides cleaning of the bleed passage 96 to remove any small particles that might block the smaller cross-sectional flow area of the bleed passage. The control valve 80 is thus self cleaning during normal usage. Also, the bleed passage 96 allows pressurized fluid to flow from the piston chamber 71 when the hydraulic pumping stops as the pair of rotary members cease to rotate relative to each other, and the clutch 68 is disengaged as the pressure in the piston chamber drops as is hereinafter more fully described. In this construction of the control valve 80, the bleed passage 96 is defined by the valve body provided by the piston 72 (FIG. 7) on which the valve element 82 is mounted.

As shown in FIGS. 7–11 and best illustrated in FIGS. 10 and 11, the coupling includes an elongated mounting recess 98 having one portion or end 100 at which the one end 84 of the valve element 82 is mounted and having another end 102 at which the main passage 94 and bleed passage 96 of the outlet port 78 are located. This recess in cooperation with the bimetallic valve element 82 provides a continually varying change in the cross-sectional flow area of flow to the outlet port 78 from the other side of the valve element such that movement of the valve element end 88 in response to temperature changes provides an accurate control of the pressure at which the valve element closes to initiate the operation of the hydraulic pump as a brake and the actuation of the clutch. For any given predetermined open position of the valve element 82, there is a certain pressure at which the hydraulic fluid of a certain velocity will cause closure of the valve element. This results from the flow of the hydraulic fluid between the valve element end 88 and the adjacent end of the recess 102 to the outlet port 78. This flow causes a pressure drop in the fluid upon passage past the valve element end 88 so that there is less force acting on the outlet side of the valve element end 88 than on the hydraulic pump side which are respectively the lower and upper sides as illustrated in FIG. 10. Movement of the valve element 82 to change the position of its end 88 in response to temperature changes varies the cross-sectional area of flow between this valve element end and the recess end 102 so as to thereby accurately compensate for temperature changes and ensure that the closure of the valve 80 corresponds to the same rate of relative rotation between the rotary members embodied by the axle half shafts 26 and 28 shown in FIG. 1.

As best illustrated in FIGS. 7–9, the valve element 82 moves radially with respect to the axis A and recess 98 is located within an elongated opening 103 that projects from the pump side of the piston 72 toward the clutch side of the piston. More specifically, the recess 98 is located within the opening 103 on the radial outward side thereof with respect to rotational axis A such that the distal valve element end 88 moves radially outward to the closed position and radially inwardly to the open position as well as moving radially outward and inward to adjust for temperature changes as previously described.

With reference to FIGS. 7–9, the hydraulic coupling is also illustrated as including a valve closure 104 that moves the valve element 82 to the closed position with respect to the outlet port 78 upon rotation of the coupling casing above a predetermined vehicle speed. This valve closure provides the immediate coupling between the rotary members embodied by the axle half shafts upon any relative rotation therebetween by operation of the hydraulic pump as a brake as well as immediate actuation of the clutch in the manner previously described. This valve closure 104 is preferably constructed to include a centrifical weight 106 having a pivotal connection 108 that provides mounting thereof such as on the piston 72 in the embodiment illustrated. The valve closure 104 also includes an actuating portion 110 that extends from the centrifical weight 106 and engages the valve element 82 to move the valve element to the closed position with respect to the outlet port 78 upon rotation of the coupling casing above the predetermined speed. More specifically, such rotation causes the centrifical force of the weight 106 to overcome the resiliency of the valve element 82 and provide movement thereof from the open position to the closed position so that the braking action provided by the hydraulic pump and the clutch actuation are immediate upon any relative rotation between the rotary members embodied by the axle half shafts as previously described.

With reference to FIG. 1, the hydraulic coupling 20 whose one rotary member embodied by the right axle half shaft 26 is connected with the casing 34 also has the clutch 68 previously described that extends between the other rotary member embodied by the other axle half shaft 28 and the casing. This clutch 68 includes alternating sets of clutch plates 112 and 114 with the one set of clutch plates 112 having outer peripheries with spline connections 116 to the casing 34, and with the other set of clutch plates 114 having a central opening with spline connections 118 to the axle half shaft 28 which also has spline connections 120 to the pump impeller 50 on the opposite side of the insert 70 from the clutch. Pumped hydraulic fluid acting on the clutch piston 72 as previously described compresses the sets of clutch plates 112 and 114 to provide the coupling between the casing 34 and the rotary member embodied by the axle half shaft 28. Pumped hydraulic fluid that flows through the actuating piston 72 through the bleed passage of the outlet port previously described then flows along the axle half shafts 26 and 28 for passage out of the casing 34.

As previously mentioned, the hydraulic coupling 32 illustrated in FIG. 1 has the planetary gear set 36 which is of the bevel gear type connecting the casing 34 and the one rotary member embodied by the right axle half shaft 26. This planetary gear set is positioned on the opposite side of a casing wall 122 from the clutch 68 and includes a pair of side gears 124 and 126 which have respective spline connections 128 and 130 to the rotary members embodied by the axle half shafts 26 and 28. Planet gears 132 of the gear set 36 are each meshed with the pair of side gears 124 and 126 and are rotatably supported by a cross pin 134 that extends through the rotational axis A between opposite sides of the casing 34. The planetary gear set 36 provides a differential action between the rotary members embodied by the axle half shafts 26 and 28 until closure of the valve 80 causes the hydraulic pump 48 to function as a brake and also actuate the clutch 68 as previously described whereupon the axle half shaft 26 is coupled through the spline connections 128, side gear 124, planet gears 132, side gear 126 and the spline connections 130 with the other axle half shaft 28.

With reference to FIG. 12, a related embodiment of the hydraulic coupling is indicated by reference numeral 32a. This embodiment of the hydraulic coupling 32a has the same construction as the embodiment disclosed in FIGS. 1–11 except as will be noted and thus has like reference numerals applied to like components thereof such that much of the previous description is applicable and thus need not be repeated. However, in this embodiment, there is no clutch as with the previously described embodiment such that the braking action provided by the hydraulic pump 48 provides the sole coupling between the impeller 50 and the ring gear 54 and thus also the sole coupling between the pair of rotary members embodied by the right and left axle half shafts 26 and 28. In this embodiment, the casing cap member 40 has a pair of inlets 58 located on opposite sides of the rotational axis A, with each being provided with an associated check valve 60 but only one being fully shown and the other illustrated by a single phantom line schematic representation. Furthermore, the casing cap member 40 also has a pair of the outlet ports 78 located on opposite sides of the rotational axis A with each being provided with a control valve 80 of the same construction previously discussed, but with only one outlet and associated control valve being shown by full line representation and the other merely shown by a single phantom line schematic representation. Such provision of the pair of inlet ports and associated check valves and the pair of outlet ports and associated control valves allows the braking action provided by the hydraulic pump 48 to operate in both directions of relative rotation between the rotary members embodied by the axle half shafts 26 and 28.

With reference to FIG. 13, another embodiment of the hydraulic coupling is indicated by 32b and includes components that are identical to the previously described embodiment except as will be noted such that like reference numerals are applied thereto and much of the previous description is applicable and need not be repeated. However, the hydraulic coupling 32b functions to provide four wheel driving and has the rotary member 26 provided with a fixed bolt connection 136 to the casing 34. This rotary member 26 has a ring shape through which the rotational axis A extends, and the other rotary member 28 has an elongated shape that extends through the casing 34 and through the ring shape of the one rotary member 26. The hydraulic pump 48 and clutch 68 are located within the casing 34 and operate in the same manner as the previously described in connection with the embodiment of FIG. 1 except for the fact that there is no associated planetary gear set. During use, the one rotary member 26 provides a take off for auxiliary axle driving while the other rotary member 28 provides the driving between the vehicle engine and the primary drive axle. However, when there is a difference in rotational speed between the axles, the operation of the hydraulic coupling 32b then couples the axles to each other in the same manner previously described in connection with the pump and clutch operation.

With reference to FIG. 14, a further embodiment of the hydraulic coupling 32c has a similar construction to the previously described embodiment except as will be noted and thus has like reference numerals applied to like components thereof such that much of the previous description is applicable and need not be repeated. This embodiment of the hydraulic coupling 32c functions as a differential between two axle half shafts 26 and 28 driven by a rotary drive member 24 without any planetary gear set. Rather, each axle half shaft 26 and 28 has an associated hydraulic pump 48 and clutch 68 like the previously described embodiments. The clutches 68 are located adjacent each other and separated as illustrated by a floating spacer 138. As such, actuation of either of the clutches 68 also actuates the other clutch to coordinate their operations with each other.

With reference to FIGS. 15 through 17, each transfer port 74 extends through the insert 70 from the pump side toward the piston side and has the associated check valve 76 mounted on the piston side where the piston is sealed between inner and outer annular flanges 142 and 144 by respective Q-rings 146 and 148. On the pump side, the transfer port 74 has an enlarged shallow collection portion 150 that allows the pumped hydraulic fluid to be received from different radial locations for eventual flow through the transfer port and the check valve 76 in the piston side in order to provide the piston actuation as previously described. As best illustrated in FIGS. 16 and 17, each check valve 76 includes a metallic strip valve element 152 having one end 154 mounted on the metallic insert by suitable fasteners 156 such as the headed bolts shown and has another distal end 158 that is normally biased to the closed position of FIG. 16 by a resilient spring force of the valve element. However, the pressurized fluid upon pumping acts against the spring bias to provide opening of the valve distal end 158 as shown in FIG. 17 to permit the fluid flow that moves the piston and actuates the clutch as previously described.

Figure 26:
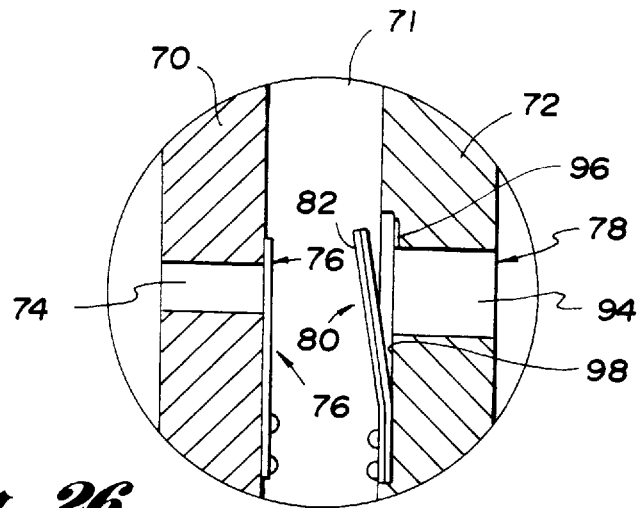
FIG. 26 illustrates the manner in which the transfer port and the control valve of the hydraulic coupling can be tuned to have the transfer port of a smaller size than the outlet port controlled by the control valve.
Figure 27:
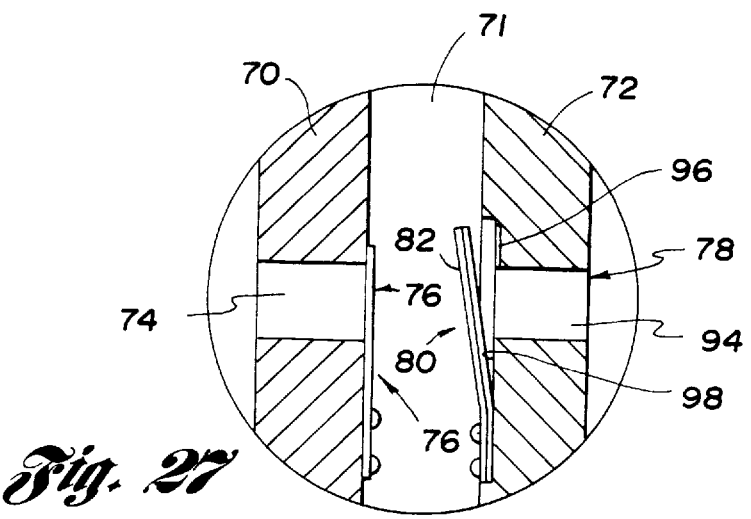
FIG. 27 is a view that illustrates the manner in which the hydraulic coupling can be tuned to have the transfer port the same size as the outlet port controlled by the control valve.
Figure 28:
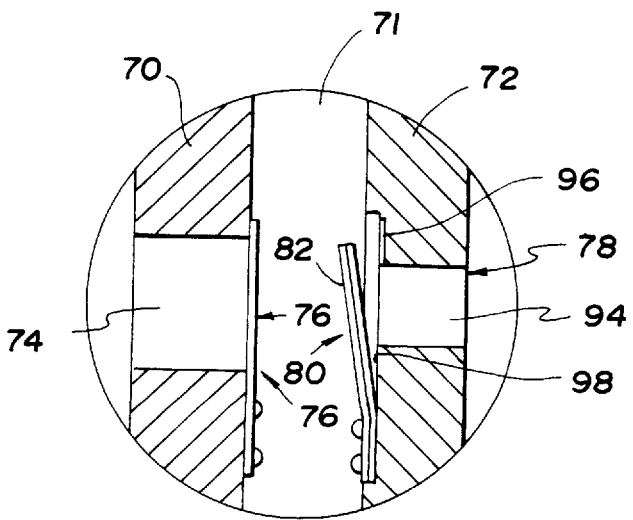
FIG. 28 illustrates the manner in which the hydraulic coupling can be tuned to have the transfer port larger than the outlet port controlled by the control valve.

It should be noted that the cross-sectional flow area through the transfer port 74 shown in FIG. 15 and the cross-sectional flow area through the open control valve 80 shown in FIGS. 9 and 10 are normally tuned to be approximately equal to each other as is also shown in FIG. 27. Tuning of the coupling can also be performed as shown in FIG. 26 by making the cross-sectional flow area of the transfer port 74 smaller than the cross-sectional flow area of the open control valve 80 to delay the control valve closing and the consequent actuation of the clutch 68. Furthermore, faster control valve closing and consequent clutch actuation can be achieved by making the cross-sectional flow area of the transfer port 74 larger than the cross-sectional flow area of the open control valve 80 as shown in FIG. 28. In addition, it may also be possible to tune the operation by controlling the closing spring bias of the transfer port valve element 152.

Figure 18:
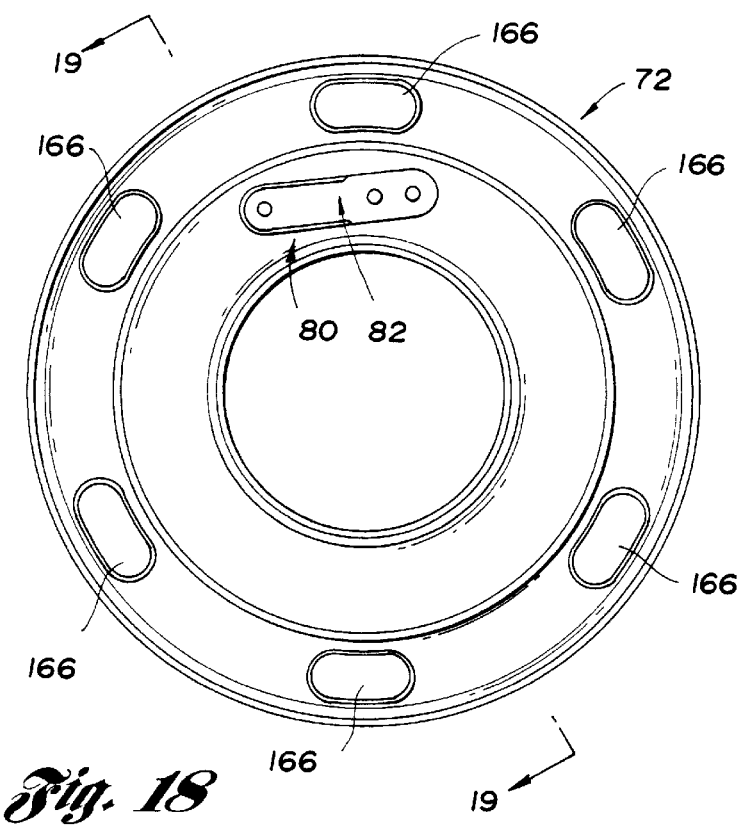
FIG. 18 is an axial view of one construction of an actuating piston of the clutch.
Figure 19:
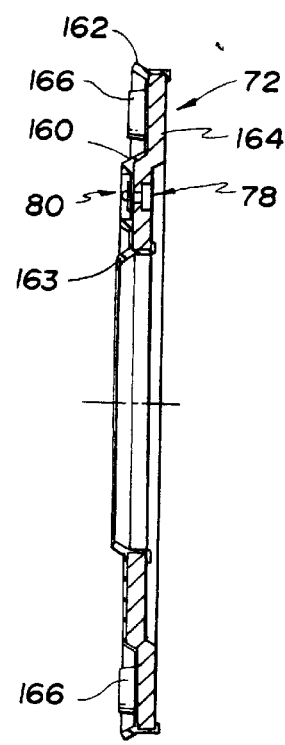
FIG. 19 is a sectional view of the actuating piston taken along the direction of line 19—19 in FIG. 18.

With reference to FIGS. 18 and 19, the piston 72 of the hydraulic coupling is illustrated as having the control valve 80 mounted thereon as previously described and also is shown as having a coating 160 of an elastomeric rubber-like material, such as for example an ethylene acrylic resin, on its one side which faces the hydraulic pump in the assembled condition. This coating 160 also defines outer and inner annular seals 162 and 163 for sealing with the adjacent outer and inner annular walls of the coupling to provide a slidably sealed relationship. This coating 160 is injection molded to a stamped steel plate 164 of the piston 72 and also has positioning lugs 166 spaced circumferentially about its periphery so as to protect the seal 162 when the piston moves to its full extent toward the left within the casing of the coupling.

Figure 20:
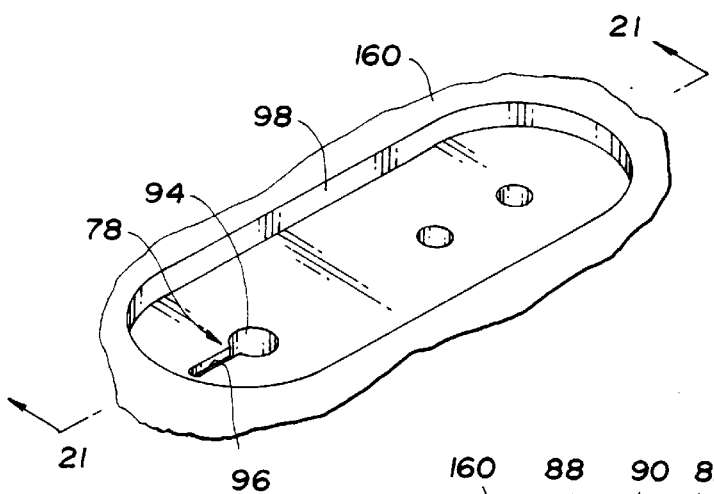
FIG. 20 is a perspective view illustrating the control valve outlet port which includes a main passage and a bleed passage and which is mounted within a recess.
Figure 21:
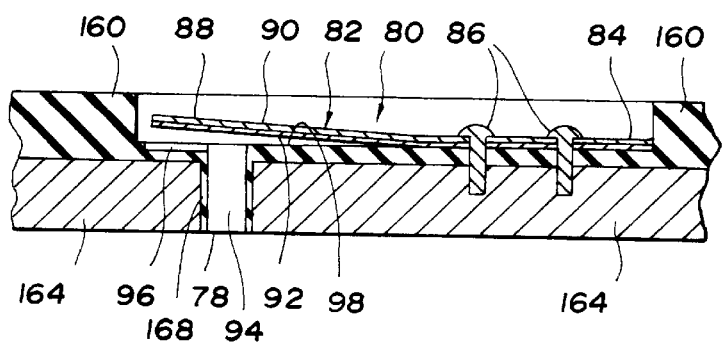
FIG. 21 is a sectional view taken through the control valve generally in the direction of line 21—21 in FIG. 20 and also illustrates the valve element that controls fluid flow through the port illustrated.

With additional reference to FIGS. 20 and 21, the coating 160 is injection molded to define the outlet port 78 with its main passage 94 and bleed passage 96 previously described as well as to define the mounting recess 98 in which the valve element 82 of the control valve 80 is mounted as specifically shown in FIG. 21. Injection molding of the coating facilitates the provision of the outlet port 78 with its main passage 94 and bleed passage 96. Furthermore, it should be noted the coating 160 may have an annular portion 168 that extends through a hole in the piston plate 164 to readily define the required cross-sectional flow area of the main passage 94 of the outlet port 78 to thereby also facilitate tuning of the coupling as described above.

Figure 22:
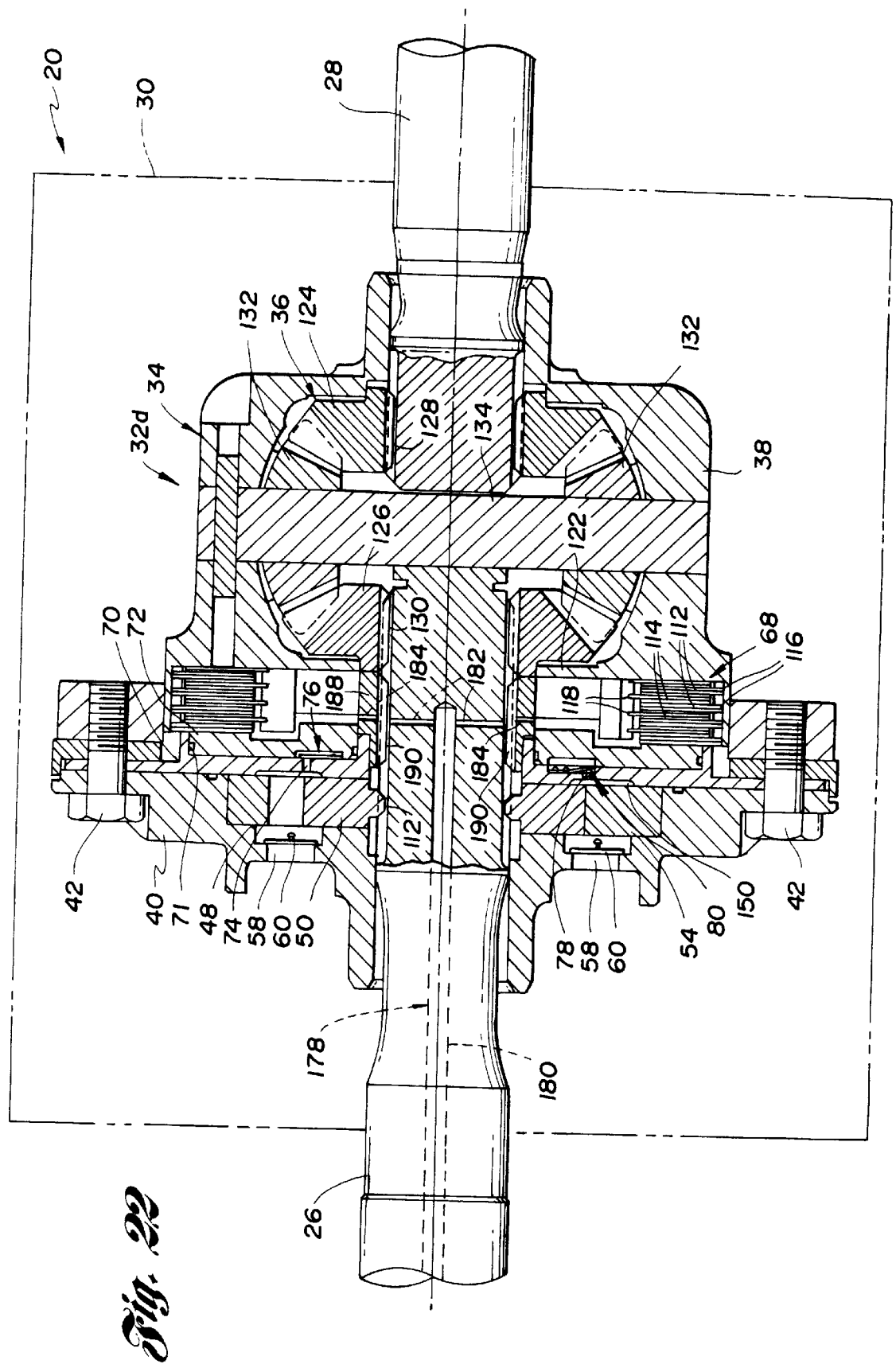
FIG. 22 is a view similar to FIG. 1 of another embodiment which includes a supercharged circuit of pumped fluid between the hydraulic pump and the clutch.

With reference to FIG. 22, another embodiment of the hydraulic coupling is indicated by 32d and includes components that are generally the same as the previously described embodiments except as will be noted such that like reference numerals are applied thereto and much of the previous description is applicable and need not be repeated. This embodiment of the hydraulic coupling has the wall of the casing insert 70 that separates the hydraulic pump 48 and the clutch 68 provided with both the transfer port 74 and the outlet port 78 extending therethrough as opposed to the prior embodiment wherein the outlet port extends through the actuating piston of the clutch. This construction provides a supercharged circuit as described below.

Figure 23:
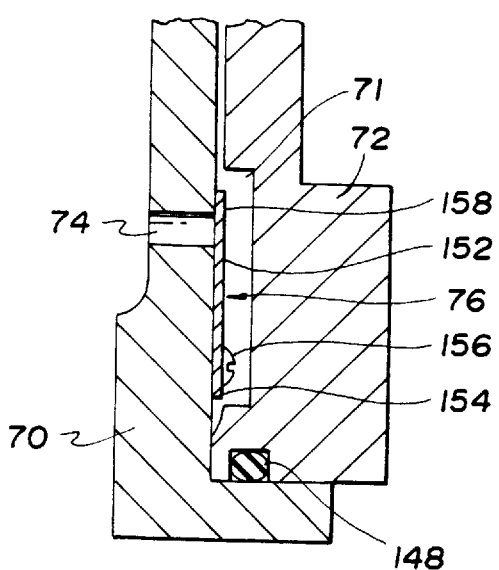
FIG. 23 is a partial view that illustrates a valved transfer port of the supercharged circuit.
Figure 24:
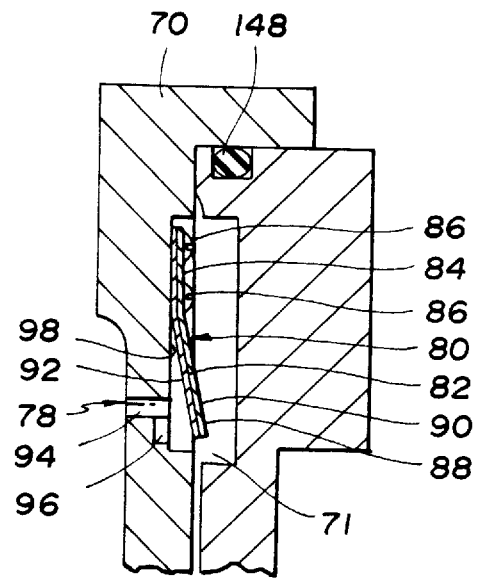
FIG. 24 is a view that illustrates the control valve for the outlet port of the supercharged circuit.
Figure 25:
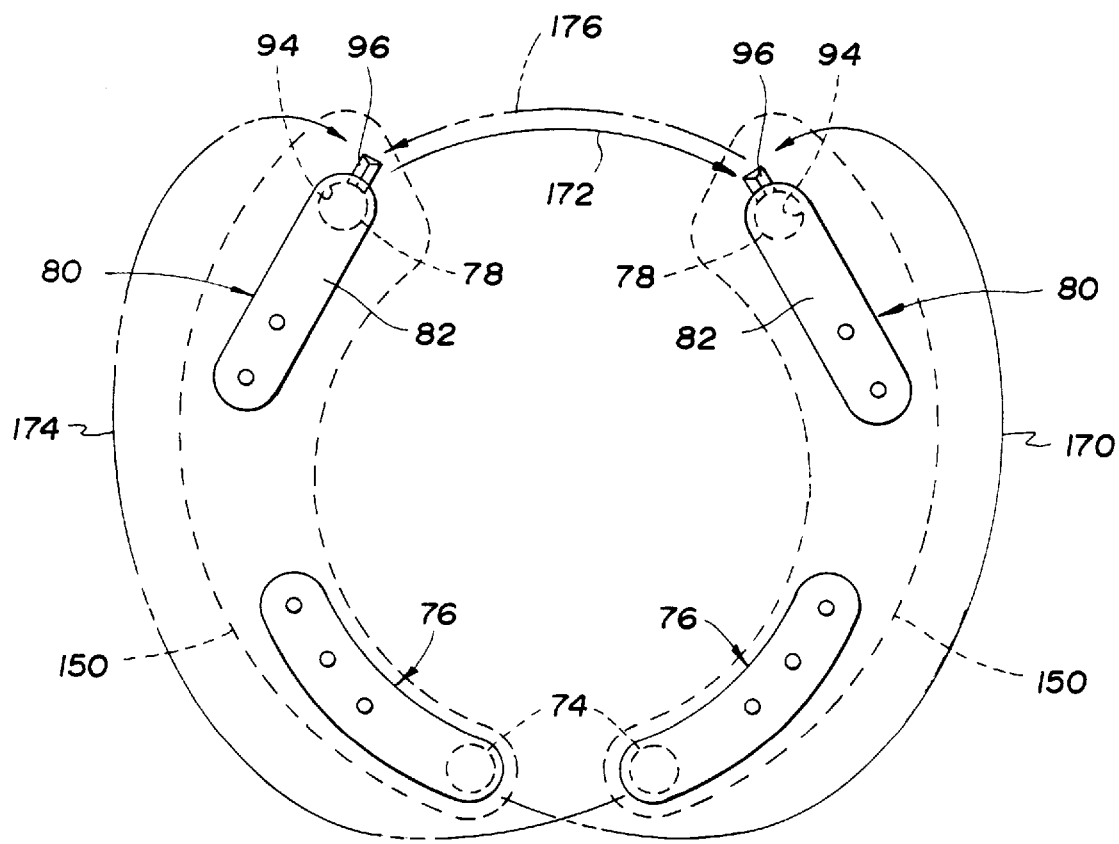
FIG. 25 is a schematic view that illustrates the fluid flow of the supercharged circuit.

More specifically as illustrated in FIGS. 23–25, two sets of transfer and outlet ports 74 and 78 with associated check valves 76 and control valves 80 are provided with each set located within an associate collection portion 150 on the pumped side of the insert wall through which the ports extend. During one direction of relative rotation between the rotary members 26 and 28 (FIG. 2), the pumped hydraulic fluid flows from the hydraulic pump through the left transfer and outlet ports 74 and 78 shown in FIG. 25 to the piston chamber for flow to the right outlet port 78 back to the low pressure side of the pump as illustrated by the two solid line indicated arrows 170 and 172. During the other direction of relative rotation between the pair of rotary members, the hydraulic fluid flows from the pump through the right transfer and outlet ports 76 and 78 into the piston chamber for flow to the left outlet port 78 as shown by the phantom line indicated arrows 174 and 176. As such, there is a continual pumping during relative rotation between the pair of rotary members from the hydraulic pump to the piston chamber 71 to provide actuation of the clutch 68 while the hydraulic fluid is then pumped back to the low pressure side of the hydraulic pump for further pressurization.

With the FIG. 22 embodiment of the hydraulic coupling 32d, there is no flow of the hydraulic fluid to the clutch plates 112 and 114. As such, it is desirable to have a lubricating passage 178 as shown for providing lubrication to the clutch plates. This lubrication passage 178 includes passage portions 180 and 182 through one of the rotary members 26 and a passage portion 184 through a connector 186 having spline connections 188 to the rotary member 26 and also having the spline connections 118 previously described to the clutch plates 114. Flow through these passage portions 180, 182 and 184 of the lubricating passage 178 from a suitable pumped source thus provides lubrication that functions as a coolant for the clutch plates 112 and 114 on the clutch plate side of the piston 72.

Figure 29:
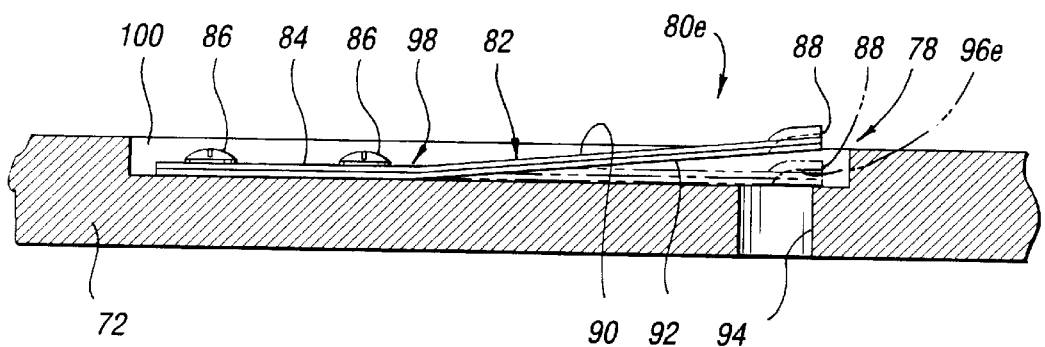
FIG. 29 is a sectional view similar to FIG. 10 of a modified construction of the control valve.
Figure 30:
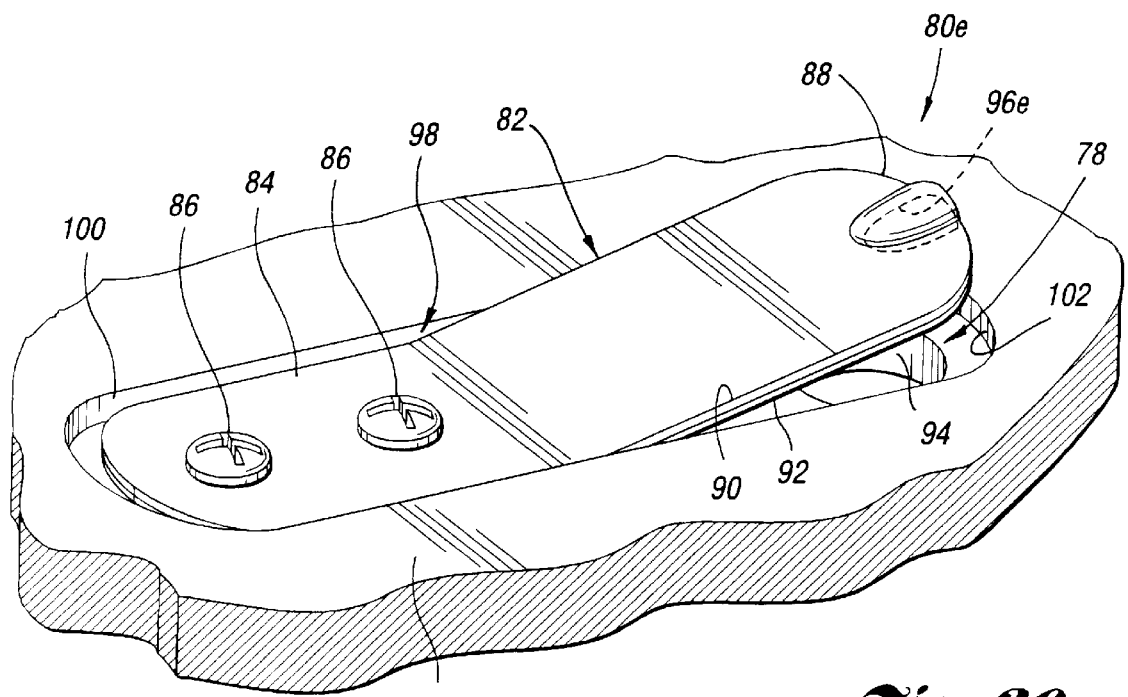
FIG. 30 is a perspective view similar to FIG. 11 but with the modified construction of the control valve.
Figure 31:
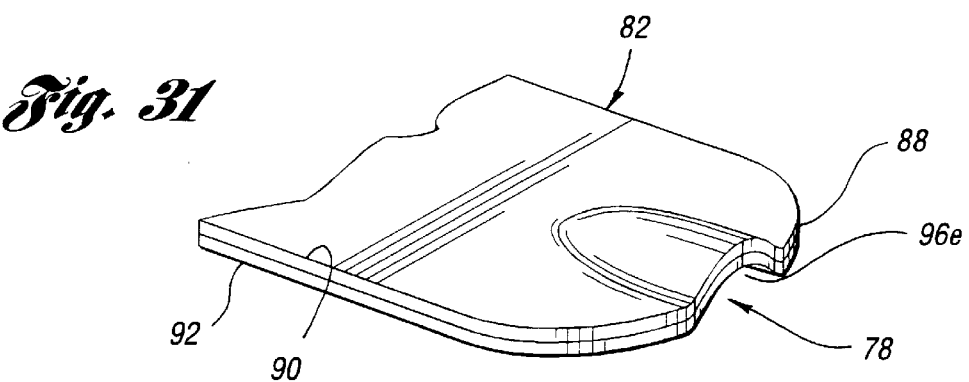
FIG. 31 is a partial view illustrating the distal end of the valve element which defines the bleed passage of the outlet port.

With reference to FIGS. 29–31, another version of the control valve 80e is illustrated and has the same construction as the previously described control valves except as will be noted such that like reference numerals are applied to like components thereof and the prior description is thus also applicable and will not be repeated. However, in this construction of the control valve 80e, the distal end 88 of the elongated bimetallic strip valve element 82 defines the bleed passage 96e of the port 78 while the valve body provided by the piston 72 defines the main passage 94 of the port 78. Thus, in the closed position illustrated by phantom line representation in FIG. 29, the bleed passage 96e allows pressurized hydraulic fluid to bleed through the port 78 as with the previously described embodiment and, upon opening of the valve element 82 as illustrated by solid line representation, the bleed passage 96e is cleaned of any accumulation by the fluid flow in the same manner as previously described. The operation of both valve constructions is thus similar.

Each of the embodiments of the control valve described above has its control valve element 82 provided with the distal end 88 thereof extending in an inclined relationship with respect to its mounting end 84 in the opened position of the valve. This inclined relationship is provided by a bend in the control valve element adjacent its mounting end 84. Upon movement to the closed position, the control valve element 82 assumes a generally flat shape.

With reference to FIGS. 32–38, further embodiments of the control valve are illustrated and have much of the same construction as the previously described control valves except as will be noted. As such, like reference numerals are applied to like components thereof and most of the prior description is thus also applicable and will not be repeated.

As illustrated in FIGS. 32 and 33, another embodiment of the control valve 80f includes a valve body 190 that is preferably injection molded from a suitable plastic and has one portion or end 100 at which the one portion or end 84 of the elongated valve element 82 is mounted by the fastener bolts 86 and has an end 102 at which the main passage 94 of the port 78 extends through the valve body. The valve element 82 is generally flat between its one portion 84 and its distal end 88. Recess 98 of the valve body 190 has a greater depth at the end 102 thereof than at the one portion provided by its end 100 and is inclined therebetween. As such, the control valve 80f is open with the flat valve element 82 mounted within the recess 98 and is closed by movement of the distal end 88 of the valve element toward the port 78 in the same manner previously described in connection with the bleed flow through the bleed passage 96.

With continuing reference to FIG. 32, a connector 192 of the control valve 80f is provided for securing the valve body 190 for use such as to the piston 72 as illustrated with a port portion 78' aligned with the port 78 of the valve body. This connector 192 as illustrated is embodied by a suitable plastic film 194 with a suitable adhesive on each side thereof so as to secure the valve body 190 within a recessed hole 196 of the piston 72. The film 194 may be die stamped to the required shape which as shown in FIG. 33 includes a port opening 78".

Best results with the control valve 80f are achieved when the recess 98 has a curved surface 198 providing the inclination between its one portion 100 and its end 102. Thus, the elongated control valve 82 moves into and out of engagement with the curved surface 198 by a continuously moving line as it is moved between the open and closed positions with respect to the port 78.

With reference to FIG. 34, another embodiment of the control valve 80f' has the same construction as the embodiment of FIGS. 32 and 33 except for the fact that its connector 192 instead of being a piece of double sided adhesive film is provided by at least one mechanical fastener 200,202. As illustrated, there is one fastener 200 through which the port 98 extends and which has a headed end 204 for providing a snap connection to the piston 72 through the piston port 78'. Furthermore, the other fastener 202 illustrated is located adjacent the recess mounting portion 100 extending through a hole 205 and has a snap connector end 206 for providing securement of the valve body 190 in position.

It should be appreciated that each of the embodiments illustrated in FIGS. 29–34 while illustrated for use on the piston 72 can also be mounted on the wall 70 for use in the supercharged circuit as illustrated in FIG. 25. Furthermore, each of the previously described elongated valve elements 82 has its elongated configuration provided by a straight shape although this elongated configuration can also be provided by a curved shape such as with the valve 76 shown in FIG. 25 and as is hereinafter more fully described in connection with the embodiments of FIGS. 35–38.

Figure 35:
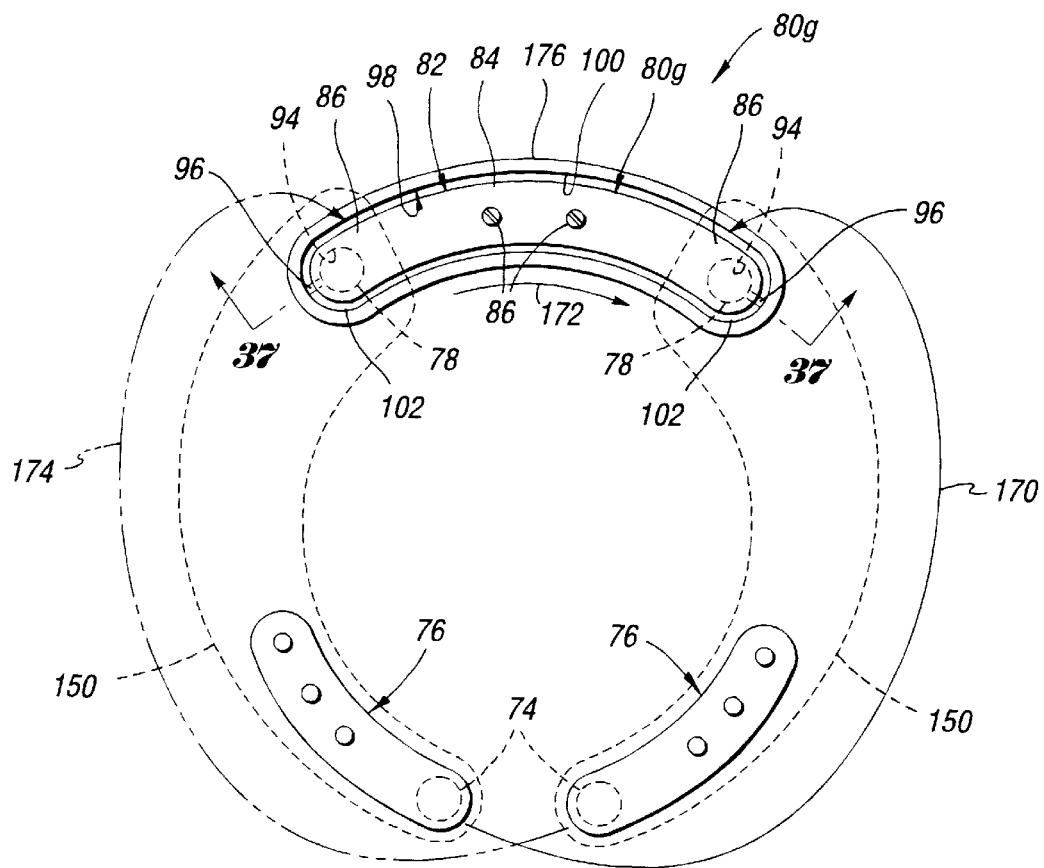
FIG. 35 is a view similar to FIG. 25 illustrating a further version of the supercharged circuit wherein the control valve of this invention is constructed to control a pair of ports.
Figure 37:
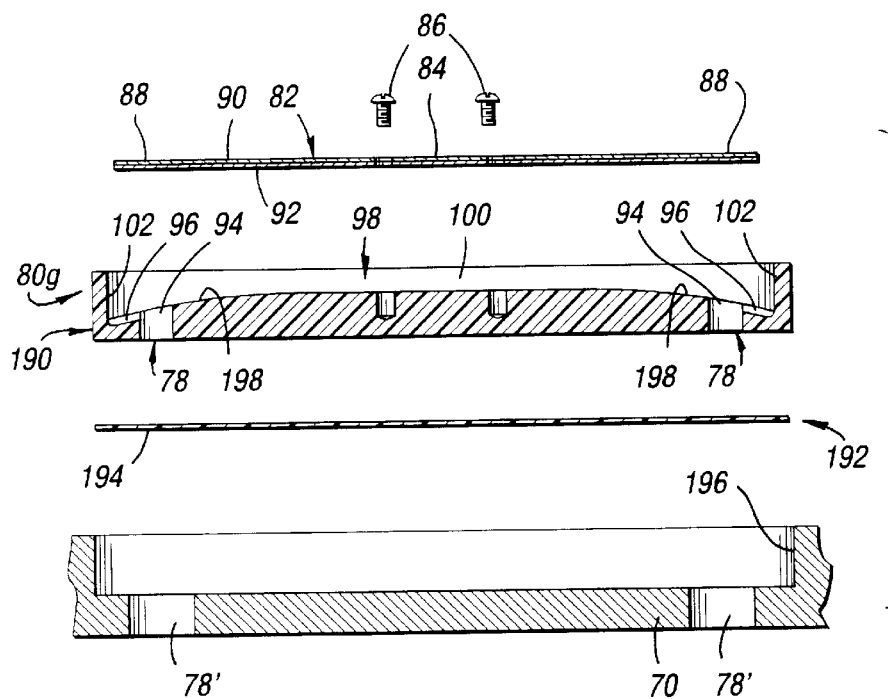
FIG. 37 is a sectional view taken along the curved line 37—37 of FIG. 35 in an exploded manner to further illustrate the construction of the control valve whose valve body is illustrated as being secured by an adhesive on a film.

With reference to FIG. 35, another embodiment of the control valve 80g is constructed to function in the supercharged circuit as previously described in connection with FIG. 25 but provides control of both ports 78 through the coupling wall for flow back to the hydraulic pump. More specifically, the valve body 190 of this embodiment of the control valve has an elongated mounting recess 98 of a curved shape including opposite ends 102 and a curved intermediate portion 100 extending between its ends. The valve element 82 is generally flat like the embodiments of FIGS. 32–34 and has a pair of opposite distal ends 88 as well as a curved intermediate portion 84 extending between its ends. This curved intermediate portion 84 of the control valve element 82 is mounted within the recess 98 at the curved intermediate portion 100 thereof by the threaded fastener bolts 86. Both ports 78 have the same construction as each other with a main passage 94 and a bleed passage 96 that function as previously described adjacent the associated ends 102 of the recess 98. This recess 98 has a greater depth at each end 102 thereof than at the intermediate portion 100 and is inclined from each end thereof to its intermediate portion as illustrated in FIG. 37. This inclination is preferably provided by a pair of curved surfaces 198 such that each distal end 88 of the flat valve element 82 moves by a continually moving line into and out of engagement with the associated curved surface upon movement between the open and closed positions with respect to the associated port 78.

As illustrated in FIG. 37, the control valve 80g has a connector 192 that is embodied by a double-sided adhesive plastic film 194 like the previously described embodiment of FIGS. 32 and 33. Likewise, while the valve body 198 is preferably a plastic injection molding made from a suitable plastic or a die casting made from steel or aluminum, other ways of manufacturing the valve body are possible.

Figure 36:
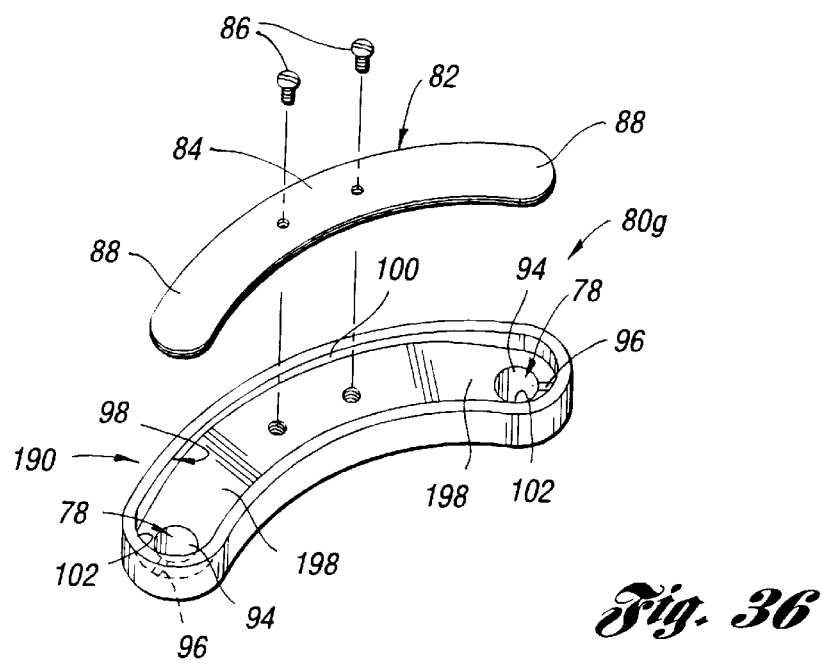
FIG. 36 is an exploded perspective view of the control valve of FIG. 35.
Figure 38:
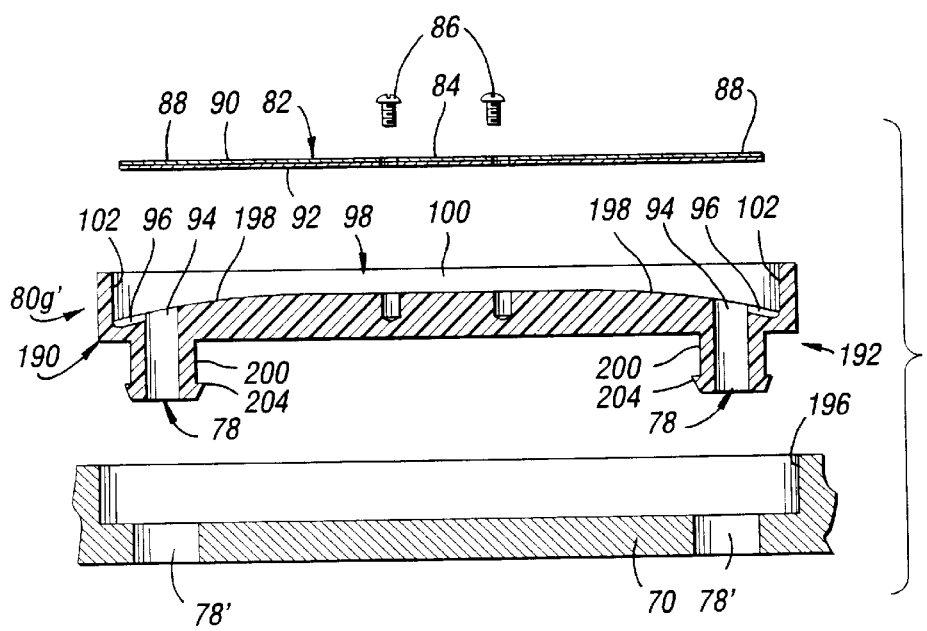
FIG. 38 is a sectional view of a further embodiment of the control valve taken in the same direction as FIG. 37 and having the same construction except for mounting thereof that is provided by mechanical fasteners illustrated as being injection molded with the valve body.

As illustrated in FIG. 38, another embodiment of the control valve 80g' has the same construction as the control valve 80g of FIGS. 35–37 but has its connector 192 embodied by a pair of the mechanical fasteners 200 like the control valve element of FIG. 34. As such, these mechanical fasteners 200 extend through suitable port portions 78' in the coupling wall 70 such that the control valve provides a control of the flow back to the pump in the manner previously described in connection with FIG. 25.

It should be appreciated that each of the embodiments of FIGS. 32–38 while illustrated with the valve body 190 as an injection molding could also be constructed as part of the piston or the coupling wall that provides part of the piston housing in the broadest aspect of the invention. However, particular advantages are achieved by the injection molding of the valve body as specifically disclosed.

It should also be appreciated that each of the embodiments wherein the bleed passage 96 is illustrated as being part of a valve body could also have the bleed passage constructed as part of the distal end 88 of the associated valve element 82 like the embodiment of FIGS. 29–31.

While the best modes for carrying out the invention have been described in detail, those familiar with the art to which this invention relates will recognize various alternatives, designs and embodiments for practicing the present invention as defined by the following claims.

What is claimed is:

1. A hydraulic coupling for use in a vehicle drivetrain including a pair of rotary members and a housing for receiving hydraulic fluid and from which the pair of rotary members project, the hydraulic coupling comprising:

a casing supported for rotation within the housing;

a hydraulic pump located within the casing and including an impeller having external teeth, and the pump also including an internal ring gear having internal teeth meshed with the external teeth of the impeller to pump hydraulic fluid from the housing upon relative rotation between the pair of rotary members;

a clutch located within the casing and being actuable by pumped hydraulic fluid from the pump to couple the pair of rotary members to each other; and a control valve that is opened and closed to control actuation of the clutch, said control valve including a main passage and also including a bleed passage through which the pumped hydraulic fluid flows when the control valve is closed, and the bleed passage being cleaned when the control valve is opened.

2. A hydraulic coupling for use in a vehicle drivetrain including a pair of rotary members and a housing for receiving hydraulic fluid and from which the pair of rotary members project, the hydraulic coupling comprising:

a casing supported for rotation within the housing;

a hydraulic pump located within the casing and including an impeller having external teeth, and the pump also including an internal ring gear having internal teeth meshed with the external teeth of the impeller to pump hydraulic fluid from the housing upon relative rotation between the pair of rotary members;

a clutch located within the casing and including a piston that is actuated by pumped hydraulic fluid from the pump such that the clutch couples the pair of rotary members to each other; and a control valve that is opened and closed to control actuation of the clutch, said control valve including a main passage extending through the piston and also including a bleed passage through which the pumped hydraulic fluid flows when the control valve is closed, and the bleed passage being cleaned when the control valve is opened.

3. A hydraulic coupling for use in a vehicle drivetrain including a pair of rotary members and a housing for receiving hydraulic fluid and from which the pair of rotary members project, the hydraulic coupling comprising:

a casing supported for rotation within the housing;

a planetary gear set that extends between the casing and the pair of rotary members to provide a differential action;

a hydraulic pump located within the casing and including an impeller having external teeth, and the pump also including an internal ring gear having internal teeth meshed with the external teeth of the impeller to pump hydraulic fluid from the housing upon relative rotation between the pair of rotary members;

a clutch located within the casing and being actuable by pumped hydraulic fluid from the pump to connect the casing and one of the rotary members to terminate the differential action of the planetary gear set and couple the pair of rotary members to each other; and a control valve that is opened and closed to control actuation of the clutch, said control valve including a main passage and also including a bleed passage through which the pumped hydraulic fluid flows when the control valve is closed, and the bleed passage being cleaned when the control valve is opened.

4. A hydraulic coupling for use in a vehicle drivetrain including a pair of rotary members and a housing for receiving hydraulic fluid and from which the pair of rotary members project, the hydraulic coupling comprising:

a casing supported for rotation within the housing;

a planetary gear set that extends between the casing and the pair of rotary members to provide a differential action;

a hydraulic pump located within the casing and including an impeller having external teeth, and the pump also including an internal ring gear having internal teeth meshed with the external teeth of the impeller to pump hydraulic fluid from the housing upon relative rotation between the pair of rotary members;

a clutch located within the casing and including a piston that is actuated by pumped hydraulic fluid from the pump such that the clutch connects the casing and one of the rotary members to terminate the differential action of the planetary gear set and couple the pair of rotary members to each other; and a control valve that is opened and closed to control actuation of the clutch, said control valve including a main passage extending through the piston and also including a bleed passage through which the pumped hydraulic fluid flows when the control valve is closed, and the bleed passage being cleaned when the control valve is opened.

5. A hydraulic coupling for use in a vehicle drivetrain differential for coupling a pair of vehicle axle half shafts and including a housing for receiving hydraulic fluid and from which the pair of axle half shafts project, the hydraulic coupling comprising:

a casing supported for rotation within the housing;

a bevel gear type planetary gear set that extends between the casing and the pair of axle half shafts to provide a differential action;

a hydraulic pump located within the casing and including an impeller having external teeth, and the pump also including an internal ring gear having internal teeth meshed with the external teeth of the impeller to pump hydraulic fluid from the housing upon relative rotation between the pair of axle half shafts;

a clutch located within the casing and being actuable by pumped hydraulic fluid from the pump to connect the casing and one of the axle half shafts to terminate the differential action of the planetary gear set and couple the pair of axle half shafts to each other; and a control valve that is opened and closed to control actuation of the clutch, said control valve including a main passage and also including a bleed passage through which the pumped hydraulic fluid flows when the control valve is closed, and the bleed passage being cleaned when the control valve is opened.

6. A hydraulic coupling for use in a vehicle drivetrain differential for coupling a pair of vehicle axle half shafts and including a housing for receiving hydraulic fluid and from which the pair of axle half shafts project, the hydraulic coupling comprising:

a casing supported for rotation within the housing;

a bevel gear type planetary gear set that extends between the casing and the pair of axle half shafts to provide a differential action;

a hydraulic pump located within the casing and including an impeller having external teeth, and the pump also including an internal ring gear having internal teeth meshed with the external teeth of the impeller to pump hydraulic fluid from the housing upon relative rotation between the pair of axle half shafts;

a clutch located within the casing and including a piston that is actuated by pumped hydraulic fluid from the pump such that the clutch connects the casing and one of the axle half shafts to terminate the differential action of the planetary gear set and couple the pair of axle half shafts to each other; and a control valve that is opened and closed to control actuation of the clutch, said control valve including a main passage extending through the piston and also including a bleed passage through which the pumped hydraulic fluid flows when the control valve is closed, and the bleed passage being cleaned when the control valve is opened.

* * * * *